(12) United States Patent
Takamori et al.

(10) Patent No.: US 11,407,871 B2
(45) Date of Patent: Aug. 9, 2022

(54) METHOD FOR MODIFYING POLYMER, METHOD FOR PRODUCING MODIFIED POLYMER USING THE SAME, AND MODIFIED POLYMER

(71) Applicants: EARTH CORPORATION, Tokyo (JP); OSAKA UNIVERSITY, Suita (JP)

(72) Inventors: Kiyoto Takamori, Tokyo (JP); Kei Ohkubo, Osaka (JP); Tsuyoshi Inoue, Osaka (JP); Yasushi Mizuta, Chiba (JP); Yuichi Itou, Chiba (JP)

(73) Assignees: Earth Corporation, Tokyo (JP); Osaka University, Osaka (JP)

( * ) Notice: Subject to any disclaimer, the term of this patent is extended or adjusted under 35 U.S.C. 154(b) by 503 days.

(21) Appl. No.: 16/470,115

(22) PCT Filed: Dec. 16, 2017

(86) PCT No.: PCT/JP2017/045226
§ 371 (c)(1),
(2) Date: Jun. 14, 2019

(87) PCT Pub. No.: WO2018/110710
PCT Pub. Date: Jun. 21, 2018

(65) Prior Publication Data
US 2019/0315936 A1    Oct. 17, 2019

(30) Foreign Application Priority Data

Dec. 16, 2016  (JP) .............................. JP2016-244690

(51) Int. Cl.
*C08F 2/46* (2006.01)
*C08F 2/50* (2006.01)
*C08G 61/04* (2006.01)
*C08J 7/12* (2006.01)

(52) U.S. Cl.
CPC ........... *C08J 7/123* (2013.01); *C08J 2323/30* (2013.01); *C08J 2333/12* (2013.01); *C08J 2369/00* (2013.01); *C08J 2383/06* (2013.01)

(58) Field of Classification Search
CPC ....... C08J 7/123; C08J 7/18; C08J 7/00; C08J 2323/30; C08J 2323/12; C08J 2323/06; C08J 2369/00; C08J 2333/12; C08J 2333/10; C08J 2383/06
USPC ....... 522/129, 113, 1, 6, 189, 184, 71; 520/1
See application file for complete search history.

(56) References Cited

FOREIGN PATENT DOCUMENTS

| EP | 1 072 635 | 1/2001 | | |
|---|---|---|---|---|
| EP | 3 398 925 | 11/2018 | | |
| EP | 3398925 A1 | * 11/2018 | ............ | C07C 37/60 |
| JP | 47-018297 | 5/1972 | | |
| JP | 48-27073 | 4/1973 | | |
| JP | 51-105485 | 9/1976 | | |
| JP | 9-157417 | 6/1997 | | |

OTHER PUBLICATIONS

Extended European Search Report issued in the corresponding European Patent Application No. 17879969.8 dated May 26, 2020, 7 pages.
Kujirai C. et al., "Photochemical Sutudies of Sodium Chlorite inSolution with Reference to Chlorite Bleaching", Memories of the Faculty of Engineering, University of Fukui, vol. 11, No. 2, 1963, pp. 203-214.
John B. Miller et al., "Properties of photochemically modified diamond films", Diamond and Related Materials 4, 1995, pp. 435-440.
John B. Miller et al., "Photochemical Modification of Diamond Surfaces", Langmuir 12, 1996, pp. 5809-5817.
John B. Miller., "Amines and thiols on diamond surfaces", Surface Science 439, 1999, pp. 21-33.
Julia Spanring et al., "Trialkylsilanes as reagents for the UV-induced surface modification of polybutadiene", Polymer 47, 2006, pp. 156-165.
Peng Yang et al., "Confined photo-catalytic oxidation: a fast surface hydrophilic modification method for polymeric materials", Polymer 44, 2003, pp. 7157-7164.
Samuel S. C. Yu et al., "Photochemical Grafting and Activation of Organic Layers on Glassy Carbon and Pyrolyzed Photoresist Films", Langmuir 23,2007, pp. 4662-4668.
Translation of International Search Report (dated Mar. 7, 2018) in the International Application of PCT/JP2017/045226.

* cited by examiner

*Primary Examiner* — Jessica Whiteley
(74) *Attorney, Agent, or Firm* — Hamre, Schumann, Mueller & Larson, P.C.

(57) ABSTRACT

The present invention provides a new method by which polymers can be modified. The present invention provides a method for modifying a polymer including the step of: irradiating a reaction system containing a polymer with light to react the reaction system in a presence of a compound radical, wherein the compound radical is a radical containing one element selected from the group consisting of Group 15 elements and Group 16 elements, and a Group 17 element.

18 Claims, 10 Drawing Sheets

Before light irradiation

After light irradiation

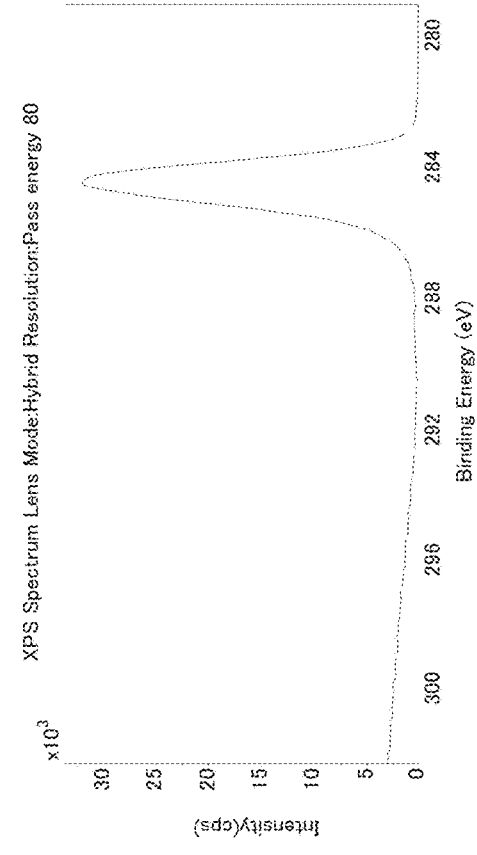
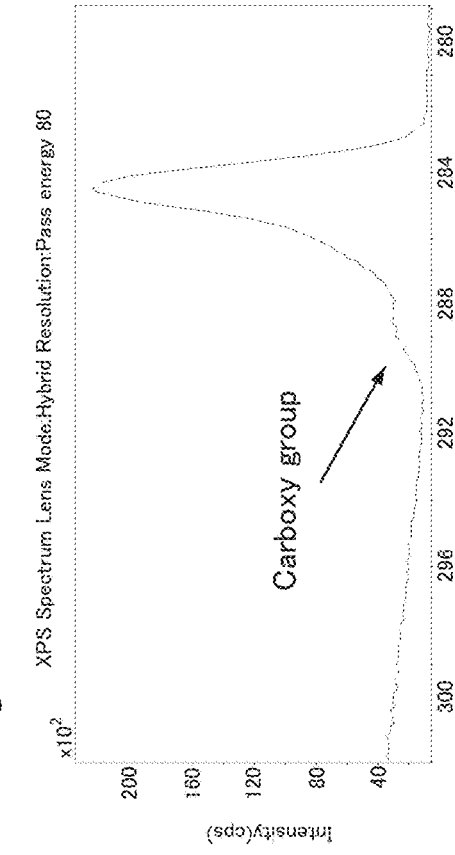
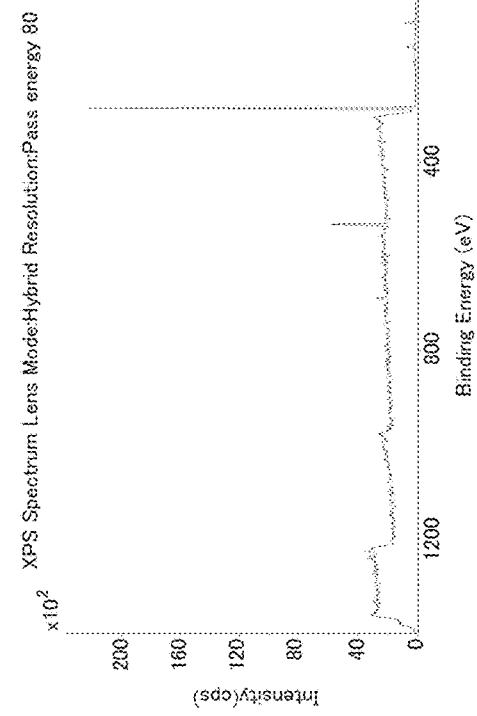
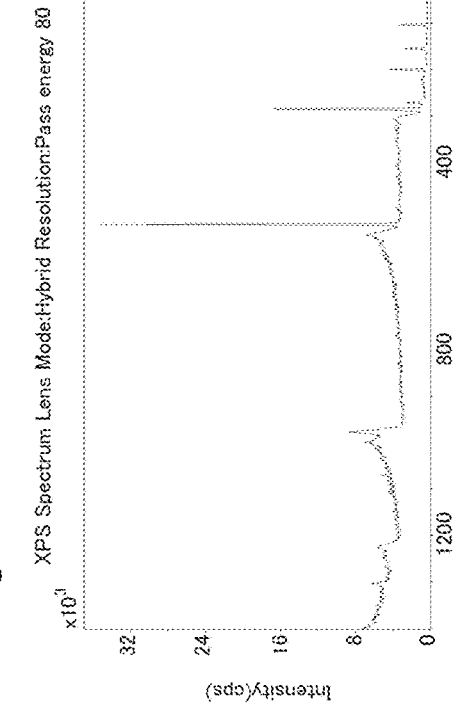
FIG. 8A1  FIG. 8A2  FIG. 8B1  FIG. 8B2

Before light irradiation

After light irradiation

Before light irradiation

After light irradiation

METHOD FOR MODIFYING POLYMER, METHOD FOR PRODUCING MODIFIED POLYMER USING THE SAME, AND MODIFIED POLYMER

TECHNICAL FIELD

The present invention relates to a method for modifying a polymer, a method for producing a modified polymer using the same, and a modified polymer.

BACKGROUND ART

In various industries, products using polymers are produced. Among them, low density polyethylene, high density polyethylene, polypropylene, polyvinyl chloride, and polystyrene are actively produced as the big five general-purpose resins and are used as molded body raw materials. In order to further impart a desired function to the polymer molded body depending on the application, for example, there is an attempt of applying a modifying treatment to the surface of the polymer molded body after molding. It is considered that the modifying treatment achieves improvement of adhesion, control of water repellency, and chemical modification while maintaining the durability and the like inherent to the polymer, for example.

As the modifying treatment, for example, corona discharge treatment, plasma discharge treatment, grafting treatment, and the like are known. Each of these modifying treatments, however, is a physical treatment method, and there has been no significant change in the past ten years.

On the other hand, as a chemical treatment method, a method using a heavy metal oxidizing agent is known. This method, however, uses a large amount of a heavy metal oxidizing agent, and thus has problems such as toxicity, processing cost, and environmental concerns.

SUMMARY OF INVENTION

Technical Problem

With the foregoing in mind, it is an object of the present invention to provide a new method for modifying a polymer. Introducing functional groups containing oxygen such as maleation denaturation and oxidative denaturation have been reported. On the other hand, polymers containing a plurality of elements of the Group 15, the Group 16, and the Group 17 of the periodic table in a specific ratio are considered to be advantageous for imparting functional diversity, however, there are few examples of reporting such polymers. Accordingly, it is also an object of the present invention to provide a polymer having a plurality of elements of the Group 15, the Group 16, and the Group 17 of the periodic table.

Solution to Problem

In order to achieve the above object, the present invention provides a first modifying method for modifying a polymer, including the step of: irradiating a reaction system containing a polymer with light to react the reaction system in a presence of a compound radical, wherein the compound radical is a radical containing one element selected from the group consisting of Group 15 elements and Group 16 elements, and a Group 17 element.

The present invention also provides a second modifying method for modifying a polymer, including the step of: irradiating a reaction system containing a polymer with light in a presence of a compound, wherein the compound is a compound containing one element selected from the group consisting of Group 15 elements and Group 16 elements, a Group 17 element, and a Group 1 element.

The present invention also provides a method for producing a modified polymer, including the step of: modifying a polymer, wherein, in the modifying step, the polymer is modified by the modifying method according to the present invention.

The present invention also provides a method for modifying a physical property of a polymer, including the step of: modifying a physical property of a polymer, wherein, in the physical property modifying step, the polymer is modified by the modifying method according to the present invention to modify the physical property.

The present invention also provides a modified polymer including: at least one element ($\alpha$) selected from the group consisting of Group 15 elements and Group 16 elements, and a Group 17 element ($\beta$); and a site in which a ratio between the element ($\alpha$)% [C$\alpha$] to all elements excluding hydrogen and helium in the polymer specified by an XPS method and the element ($\beta$)% [C$\beta$] to all elements excluding hydrogen and helium in the polymer specified by an XPS method satisfies the following condition.

$$5000 \geq [C\alpha]/[C\beta] > 0$$

Advantageous Effects of Invention

According to the modifying method of the present invention, a polymer in a reaction system can be easily modified by simply irradiating the reaction system with light.

BRIEF DESCRIPTION OF DRAWINGS

FIGS. 8A1 to 8B2 show graphs showing the results of XPS of Example B2.

DESCRIPTION OF EMBODIMENTS

Figure 1:
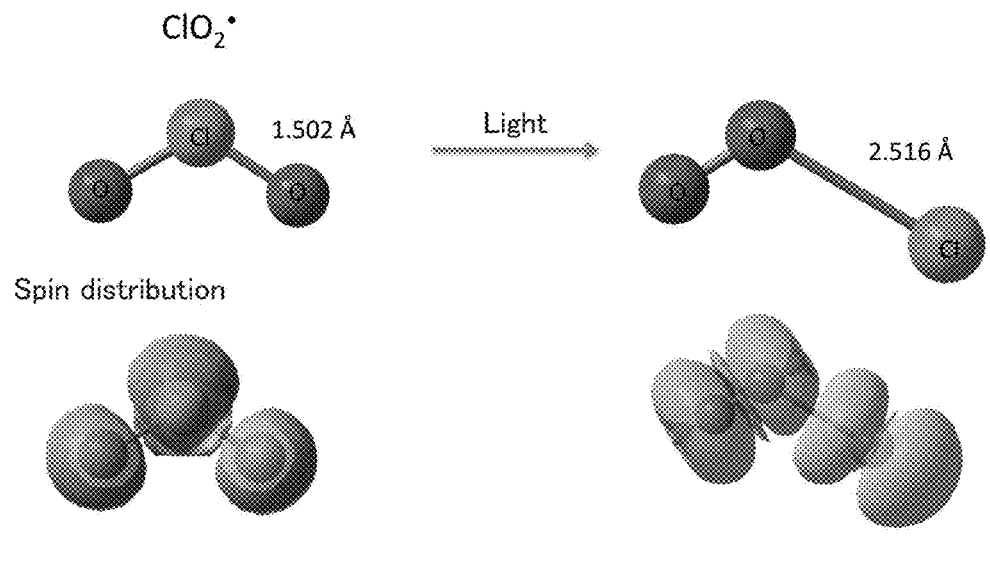
FIG. 1 shows an example of the prediction based on the calculation result of UCAM-B3LYP/6-311+G(d, p) def2TZV in the case where a chlorine dioxide radical (ClO$_2^-$) is irradiated with light.

In the present invention, the Group 15, the Group 16, and the Group 17 are the Groups of the periodic table. In this specification, unless otherwise stated, "the modifying method of the present invention" includes the first modifying method and the second modifying method.

In the modifying method of the present invention, for example, the Group 15 element is at least one of N or P, the Group 16 element is at least one selected from the group consisting of O, S, Se, and Te, and the Group 17 element is at least one selected from the group consisting of F, Cl, Br, and I.

In the modifying method of the present invention, for example, the reaction system is a gas reaction system.

In the modifying method of the present invention, for example, the gas reaction system contains the compound radical.

In the modifying method of the present invention, for example, the reaction system is a liquid reaction system.

In the modifying method of the present invention, for example, the liquid reaction system contains an organic phase.

In the modifying method of the present invention, for example, in the reaction step, at least the organic phase is irradiated with light.

In the modifying method of the present invention, for example, the liquid reaction system is a two-phase reaction system containing the organic phase and an aqueous phase.

In the modifying method of the present invention, for example, in the reaction step, the liquid reaction system is irradiated with light while bringing the liquid reaction system into contact with air.

In the modifying method of the present invention, for example, the liquid reaction system is a two-phase reaction system containing the organic phase and an aqueous phase, and in the reaction step, the aqueous phase is irradiated with light in a state in which oxygen ($O_2$) is dissolved in the aqueous phase.

In the modifying method of the present invention, for example, the organic phase contains an organic solvent, and the organic solvent is a hydrocarbon solvent.

In the modifying method of the present invention, for example, the organic phase contains an organic solvent, and the organic solvent is a halogenated solvent.

In the modifying method of the present invention, for example, the organic phase contains an organic solvent, and the organic solvent is a fluorous solvent.

In the modifying method of the present invention, for example, the compound radical is an oxide radical of the Group 17 element.

In the modifying method of the present invention, for example, the Group 17 element is halogen.

In the modifying method of the present invention, for example, the compound radical is a chlorine dioxide radical.

In the modifying method of the present invention, for example, the compound radical is a chlorine dioxide radical, the reaction system contains an organic phase, the organic phase contains the chlorine dioxide radical, a molded body of the polymer is disposed in the organic phase, and, in the reaction step, a polymer exposed on a surface of the polymer molded body is oxidized by the light irradiation.

The modifying method of the present invention further includes the step of: generating the compound radical, for example.

In the modifying method of the present invention, for example, in the compound radical generating step, a reaction system for radical generation is used, the reaction system for radical generation is a reaction system containing an aqueous phase, and the aqueous phase contains a source of the compound radical and generates the compound radical from the source of the compound radical.

In the modifying method of the present invention, for example, the compound radical is a chlorine dioxide radical, in the compound radical generating step, the source of the compound radical is chlorite ion ($ClO_2^-$), and at least one of a Lewis acid or a Brønsted acid is caused to act on the chlorite ion to generate the chlorine dioxide radical.

In the modifying method of the present invention, for example, in the reaction step, the reaction system for radical generation after the compound radical generating step is used as the reaction system.

The modifying method of the present invention further includes the step of: introducing a functional group into a changed site of the polymer, for example.

In the modifying method of the present invention, for example, in the reaction step, a reaction temperature is in a range from −100 to 200° C. and a reaction pressure is in a range from 0.1 to 10 MPa. In the modifying method of the present invention, for example, a reaction temperature is in a range from 0 to 100° C. or 0 to 40° C. and a reaction pressure is in a range from 0.1 to 0 5 MPa.

In the modifying method of the present invention, for example, the polymer is an unmolded body or a molded body. In the modifying method of the present invention, for example, the molded body is at least one selected from the group consisting of sheets, films, plates, tubes, pipes, rods, beads, and blocks.

In the modifying method of the present invention, for example, the polymer to be modified contains carbon and hydrogen and has a carbon-hydrogen bond.

In the modifying method of the present invention, for example, the polymer to be modified is polyolefin.

The second modifying method of the present invention further includes the step of: generating the compound, wherein in the compound generating step, at least one of a Lewis acid or a Brønsted acid containing a Group 1 element is caused to act on a compound ion containing one element selected from the group consisting of the Group 15 elements and the Group 16 elements, and the Group 17 element, for example.

In the second modifying method of the present invention, for example, the compound ion is an oxide ion.

In the second modifying method of the present invention, for example, the oxide ion is chlorite ion ($ClO_2^-$).

In the producing method of the present invention, for example, the polymer to be modified contains carbon and hydrogen and has a carbon-hydrogen bond.

In the producing method of the present invention, for example, the polymer to be modified is polyolefin.

In the modified polymer of the present invention, for example, the Group 15 element is at least one of N or P, the Group 16 element is at least one selected from the group consisting of O, S, Se, and Te, and the Group 17 element is at least one selected from the group consisting of F, Cl, Br, and I.

In the modified polymer of the present invention, for example, the polymer contains carbon and hydrogen and has a carbon-hydrogen bond.

In the modified polymer of the present invention, for example, the polymer is polyolefin.

The modified polymer of the present invention includes, for example, a functional group containing at least one element (α) selected from the group consisting of Group 15 elements and Group 16 elements, and a functional group containing a Group 17 element (β).

In the modified polymer of the present invention, for example, the polymer is an unmolded body.

In the modified polymer of the present invention, for example, the polymer is a molded body.

The present invention is described below in more detail with reference to illustrative examples. The present invention, however, is not limited by the following description.

As described above, the first method for modifying the polymer of the present invention includes the step of: irradiating a reaction system containing a polymer with light to react the reaction system in a presence of a compound radical, wherein the compound radical is a radical containing one element selected from the group consisting of Group 15 elements and Group 16 elements, and a Group 17 element.

(1) Polymer

In the present invention, the form of the polymer to be treated is not particularly limited, and may be, for example, a solid, an unmolded body, or a molded body. The unmolded body is, for example, a polymer itself. The molded body is, for example, a molded body molded using the polymer. The molded body may be molded by modifying the unmolded body of the polymer according to the present invention and then molding the obtained modified polymer or the molded body may be molded by molding the polymer in advance and then modifying the obtained molded body according to the present invention, for example. The type of the polymer included in the polymer is not particularly limited, and may be, for example, one type or a mixture of two or more types. The polymer may be, for example, a polymer alloy or a polymer compound.

The solid polymer may be, for example, a polymer having a melting point of room temperature or higher, or a polymer having a glass transition temperature of room temperature or higher. The polymer may be a polymer having a relatively high crystallinity, for example. In the case of the polymer having the melting point of the above-described conditions, the degree of crystallinity is, for example, 20% or more, 30% or more, and 35% or more. The molded body of the polymer can be obtained by a known molding method such as, for example, melting by heating, shaping, and cooling.

The polymer may be, for example, a polymer having liquidity (liquefied polymer). Specifically, the polymer may be, for example, a polymer having liquidity at room temperature. Examples of the polymer include synthetic oils, lubricating oils, and liquid elastomers.

The form of the polymer can be appropriately selected according to, for example, the application, purpose, and the like after the modification. For example, the solid polymer is preferable from the viewpoint of a wide application range to business.

In the present invention, the type of the polymer to be treated is not particularly limited. According to the modifying method of the present invention, the polymer to be treated can be modified. According to the modifying method of the present invention, for example, the side chain of the polymer may be changed or the main chain (straight chain) of the polymer may be changed. The change in the main chain may be, for example, a change in the end of the main chain or a change in the inside of the main chain. The above-described change (also referred to as modification) is, for example, introduction of a Group 15 element, a Group 16 element, a Group 17 element, and the like, and specific examples thereof include oxidation, sulfidation, halogenation, and the like. The polymer is modified by the change in the side chain, the main chain, or the like. The side chain is a chain (branched chain) branched from a main chain. Specifically, for example, the main chain is a chain of carbon atoms and/or heteroatoms, and the side chain is a chain branched from the main chain connected to a carbon atom or heteroatom constituting the main chain.

The polymer may be, for example, a homopolymer or a copolymer. In the case of the copolymer, for example, the number of repeating units (monomers) is two or more.

As the polymer, for example, a polymer containing carbon and hydrogen and having a carbon-hydrogen bond is preferable. In the modifying method of the present invention, for example, the carbon-hydrogen bond in the polymer is modified (e.g., oxidation as described above). Specific examples of the polymer include, but are not limited to, polyolefin, polyvinyl chloride, polystyrene, polylactic acid, polybutyric acid, silicone polymer, natural rubber, phenolic resin, epoxy resin, diallylphthalate resin, polycarbonate (PC), polymethylmethacrylate (PMMA), polydimethylsiloxane (PDMS), polyarylate (PAR) such as amorphous polyarylate, polyether sulfonic acid (PES), polyparaphenylene vinylene (PPV), polythiophene (PAT), polyfluorene (PF), polyphenylene sulfide (PPS), liquid crystal polymer (LCP), polyparaphenylene (PPP), PEDOT/PSS, and polyaniline/PSS.

The polyolefin may be, for example, a polymer of an olefin (polyolefin) having 2 to 20 carbon atoms. Examples of the polyolefin include polyethylene (PE) such as low density polyethylene and high density polyethylene, and polypropylene (PP). The polyolefin may be, for example, a copolymer.

The polymer in which the side chain is modified may be, for example, a polymer having a hydrocarbon group or a derivative group thereof as a side chain. In the present invention, a "polymer having a hydrocarbon group or a derivative group thereof as its side chain" is hereinafter also formally referred to as a "polymer A".

Specific examples of the polymer A in which the side chain is modified include, but are not limited to, the polyolefin (e.g., polyethylene (PE) such as low density polyethylene and high density polyethylene, polypropylene (PP)), polyvinyl chloride, polystyrene, polylactic acid, polybutyric acid, silicone polymer, natural rubber, phenolic resin, epoxy resin, diallylphthalate resin, polycarbonate (PC), polymethylmethacrylate (PMMA), polydimethylsiloxane (PDMS), polyarylate (PAR) such as amorphous polyarylate, polyether sulfonic acid (PES), polyparaphenylene vinylene (PPV), polythiophene (PAT), polyfluorene (PF), polyphenylene sulfide (PPS), liquid crystal polymer (LCP), polyparaphenylene (PPP), PEDOT/PSS, and polyaniline/PSS.

The polymer A may be, for example, a homopolymer or a copolymer. In the case of a homopolymer, for example, a repeating unit (monomer) forming a straight chain has a side chain. In the case of a copolymer, for example, as to each repeating unit (each monomer) forming a straight chain, at least one type of monomer may have a side chain, or two or more types of monomers may have a side chain, for example.

The hydrocarbon group or a derivative group thereof which is the side chain of the polymer A is not particularly limited, and is, for example, a monovalent group of the following hydrocarbon or a derivative thereof. The hydrocarbon may be, for example, non-aromatic or aromatic and may be saturated or unsaturated. Specifically, the hydrocarbon may be, for example, a linear or branched saturated or unsaturated hydrocarbon (e.g., a linear or branched alkane, a linear or branched alkene, a linear or branched alkyne, etc.). The hydrocarbon may also be a saturated or unsaturated hydrocarbon (e.g., cycloalkane, cycloalkene, etc.), including, for example, a non-aromatic cyclic structure. The hydrocarbon may be an aromatic hydrocarbon. The hydrocarbon may or may not have, for example, one or more aromatic or non-aromatic rings in its structure. The hydrocarbon may or may not have, for example, one or more hydrocarbon groups of linear or branched saturated or unsaturated hydrocarbons in its structure. The unsaturated hydrocarbon may be, for example, a ketone, an ester, an amide, or the like having a carbonyl group (—C(=O)—). The carbon number of the hydrocarbon is not particularly limited, and may be, for example, 1 to 40, 1 to 32, 1 to 24, 1 to 18, 1 to 12, 1 to 6, or 1 to 2, and when the hydrocarbon is an unsaturated hydrocarbon, the carbon number may be, for example, 2 to 40, 2 to 32, 2 to 24, 2 to 18, 2 to 12, or 2 to 6. Specific examples of the hydrocarbon include methane, ethane, propane, n-butane, 2-methylpropane, n-pentane, n-hexane, ethylene, propylene, 1,3-butadiene, acetylene, cyclopentane, cyclohexane, cycloheptane, cyclooctane, methylcyclohexane, cyclohexene, benzene, toluene, o-xylene, m-xylene, p-xylene, methylene, durene, biphenyl, naphthalene, 1-methylnaphthalene, 2-methylnaphthalene, anthracene, phenanthrene, pyrene, and styrene.

The "derivative" of the hydrocarbon is, for example, an organic compound containing a heteroelement (an element other than carbon and hydrogen). The hetero element is not particularly limited, and examples thereof include oxygen (O), nitrogen (N), sulfur (S), and halogen. Examples of the halogen include fluorine (F), chlorine (Cl), bromine (Br), and iodine (I). The derivative may be, for example, an organic compound having a structure in which a hydrocarbon group is bonded to any substituent or any atomic group. The derivative may be, for example, a compound having a structure in which a plurality of hydrocarbon groups is bonded by any atomic group, and the hydrocarbon group may be substituted with any one or more of substituents, or may be unsubstituted. The hydrocarbon group is not particularly limited, and for example, monovalent or divalent or more groups derived from the hydrocarbon may be used. The hydrocarbon group may have, for example, one or more of its carbon atoms substituted with a heteroatom. Specifically, for example, a pyridyl group may be formed by substituting one carbon atom of a phenyl group (and a hydrogen atom bonded thereto) with a nitrogen atom. The substituents or atomic groups are not particularly limited, and examples thereof include hydroxy groups, halogen groups (a fluoro group, a chloro group, a bromo group, an iodo group, etc.), alkoxy groups, aryloxy groups (e.g., a phenoxy group, etc.), carboxy groups, alkoxycarbonyl groups, aryloxycarbonyl groups (e.g., a phenoxycarbonyl group, etc.), mercapto groups, alkylthio groups, arylthio groups (e.g., a phenylthio group, etc.), amino groups (e.g., an amino group, an alkylamino group, a dialkylamino group, etc.) having substituents or without substituents, an ether bond (—O—), an ester bond (—CO—O—), and a thioether bond (—S—).

The polymer in which the end of the main chain is modified may be, for example, a polymer having a hydrocarbon group or a derivative group thereof as an end group. In the present invention, a "polymer having a hydrocarbon group or a derivative group thereof as its end" is hereinafter also formally referred to as a "polymer B".

The polymer B may be, for example, a homopolymer or a copolymer. In the case of a homopolymer, for example, a repeating unit (monomer) forming a straight chain may or may not have a side chain. In the case of a copolymer, for example, each repeating unit (each monomer) forming a straight chain may or may not have a side chain, for example. For example, at least one type of monomer may have a side chain, or two or more types of monomers may have a side chain, for example. In the polymer B, the side chain may be, for example, a side chain similar to that of the polymer A or a side chain other than that.

The hydrocarbon group or a derivative group thereof which is an end group of the polymer B is not particularly limited, and may be groups similar to the polymer A.

The polymer in which the inside of the main chain is modified is, for example, a polymer having a hydrocarbon group or a derivative group thereof inside the polymer. In the present invention, "a polymer having a hydrocarbon group or a derivative group thereof in its main chain" is hereinafter also formally referred to as "Polymer C".

Specifically, the polymer C may be, for example, a polymer of an olefin (polyolefin) having 2 to 20 carbon atoms. Examples of the polyolefin include polyethylene (PE) such as low density polyethylene and high density polyethylene, and polypropylene (PP). The polyolefin may be, for example, a copolymer.

The polymer C may be, for example, a homopolymer or a copolymer. In the case of a homopolymer, for example, a repeating unit (monomer) forming a straight chain may or may not have a side chain. In the case of a copolymer, for example, each repeating unit (each monomer) forming a straight chain may or may not have a side chain, for example. For example, at least one type of monomer may have a side chain, or two or more types of monomers may have a side chain, for example. In the polymer B, the side chain may be, for example, a side chain similar to that of the polymer A or a side chain other than that.

The hydrocarbon group or a derivative group thereof inside the polymer C is not particularly limited, and is, for example, a divalent group of a hydrocarbon or a derivative thereof. The hydrocarbon is, for example, an unsaturated hydrocarbon, and reference can be made to the description as to the Polymer A.

In the present invention, a chain compound (e.g., an alkane, an unsaturated aliphatic hydrocarbon, etc.) or a chain substituent derived from a chain compound (e.g., a hydrocarbon group such as an alkyl group, an unsaturated aliphatic hydrocarbon group, etc.) may be, for example, linear or branched, the carbon number may be, for example, 1 to 40, 1 to 32, 1 to 24, 1 to 18, 1 to 12, 1 to 6, or 1 to 2, and in the case of an unsaturated hydrocarbon group, the carbon number may be, for example, 2 to 40, 2 to 32, 2 to 24, 2 to 18, 2 to 12, or 2 to 6. In the present invention, the number of ring members (the number of atoms constituting a ring) of a cyclic compound (e.g., a cyclic saturated hydrocarbon, a non-aromatic cyclic unsaturated hydrocarbon, an aromatic hydrocarbon, a heteroaromatic compound, etc.) or a cyclic group derived from a cyclic compound (e.g., a cyclic saturated hydrocarbon group, a non-aromatic cyclic unsaturated hydrocarbon group, an aryl group, a heteroaryl group, etc.) is not particularly limited, and may be, for example, 5 to 32, 5 to 24, 6 to 18, 6 to 12, or 6 to 10. When a substituent or the like has isomers, for example, the type of the isomer is not particularly limited, and in the case of simply referring to a "naphthyl group" as a specific example, for example, a 1-naphthyl group or a 2-naphthyl group may be used.

In the present invention, the isomers are not particularly limited, and are, for example, tautomers or stereoisomers (e.g., a geometric isomer, a conformer, and an optical isomer). In the present invention, the salt is not particularly limited, and may be, for example, an acid addition salt or a base addition salt. An acid that forms the acid addition salt may be either an inorganic acid or an organic acid, and a base that forms the base addition salt may be either an inorganic base or an organic base. The inorganic acid is not particularly limited, and examples thereof include sulfuric acid, phosphoric acid, hydrofluoric acid, hydrochloric acid, hydrobromic acid, hydroiodic acid, hypofluorous acid, hypochlorous acid, hypobromous acid, hypoiodous acid, fluorous acid, chlorous acid, bromous acid, iodous acid, fluorine acid, chloric acid, bromic acid, iodic acid, perfluoric acid, perchloric acid, perbromic acid, and periodic acid. The organic acid also is not particularly limited, and examples thereof include p-toluenesulfonic acid, methanesulfonic acid, oxalic acid, p-bromobenzenesulfonic acid, carbonic acid, succinic acid, citric acid, benzoic acid, and acetic acid. The inorganic base is not particularly limited, and examples thereof include ammonium hydroxides, alkali metal hydroxides, alkaline-earth metal hydroxides, carbonates, and hydrogencarbonates. More specifically, the inorganic base may be, for example, sodium hydroxide, potassium hydroxide, potassium carbonate, sodium carbonate, sodium hydrogencarbonate, potassium hydrogencarbonate, calcium hydroxide, and calcium carbonate. The organic base also is not particularly limited, and examples thereof include ethanolamine, triethylamine, and tris(hydroxymethyl)aminomethane.

In the present invention, the polymer may include, for example, only one type of the polymer A, the polymer B, and the polymer C, or may include two or more types or all three types of them. The polymer may include, for example, at least one of the polymer A, the polymer B, and the polymer C, and other polymers. The other polymers are in no way limited.

In the present invention, when the polymer is the molded body, the reaction step may be performed, for example, in the liquid reaction system (liquid phase) or in the gas reaction system (gas phase). When the polymer is easily soluble in a liquid medium, for example, it is preferable to perform the reaction step in the gas phase reaction system. When the polymer is the molded body, for example, the molding method, shape, and the like are not limited in any way. The molding method is not particularly limited, and may be, for example, a known method such as compression molding, transfer molding, extrusion molding, calendar molding, inflation molding, blow molding, vacuum molding, injection molding, or the like. The shape of the molded body is not particularly limited, and may be, for example, a desired shape (e.g., a sheet, a film, a plate, a tube, a pipe, a rod, a bead, a block, etc.). The polymer molded body may be, for example, a non-porous body, a porous body, a non-woven fabric, or a woven fabric.

When the molded body is treated by the modifying method of the present invention, for example, the shape thereof is not limited at all, and for example, the molded body may be a molded body having an exposed surface. Specifically, for example, in the reaction step described below, a molded body having an exposed surface contactable to the reaction system is preferable. The exposed surface of the molded body is not particularly limited, and may be, for example, a surface exposed to the outside, or a surface exposed to the inside, such as a tube, a porous body, or the like. When the polymer is a molded body, the modifying method of the present invention can be also referred to as, for example, a method for modifying the surface of the polymer molded body.

In the present invention, when the polymer is the unmolded body, the reaction step may be performed, for example, in the liquid reaction system (liquid phase) or in the gas reaction system (gas phase). In the case of the liquid reaction system, for example, the polymer may be in a state of a slurry or in a state of a solution in the liquid phase. When the reaction step is performed in the liquid phase, it is preferable that a component (e.g., a component such as a radical) contributing to a reaction to be described below be present in the liquid phase, for example. On the other hand, when the reaction step is performed in the gas reaction system, it is preferable that the components contributing to the reaction be present in the gas phase in a state of a gas, a mist, or the like, for example.

When the reaction step is performed in the liquid reaction system, for example, it is preferable the solid polymer and a liquid medium be mixed in a state of a slurry or the like.

When the polymer itself is in a state of a liquid, for example, while only the liquid polymer may be used, it is preferable to use the polymer as a solution containing the liquid polymer and a solvent. When the solid polymer has a property of being easily dissolved in a liquid medium and when the solid polymer maintains its solid shape, for example, it is preferable to perform the reaction step in the gas phase reaction system.

(2) Compound Radical

In the present invention, the compound radical is contained in the reaction system. For example, the compound radical may be generated in the reaction system so as to be contained in the reaction system, or the compound radical generated separately may be caused to be contained in the reaction system. The method of generating the compound radical is not particularly limited. Specific examples of the generation of the compound radical are described below.

As described above, the compound radical is a radical containing at least one of Group 15 elements and Group 16 elements, and a Group 17 element. In the present invention, for example, any one type of the compound radicals may be used, or two or more types of them may be used in combination. In the present invention, the compound radical can be appropriately selected depending on, for example, the type of the polymer to be modified, reaction conditions, and the like.

The Group 15 element is, for example, N or P, the Group 16 element is, for example, O, S, Se, or Te, and the Group 17 element is, for example, F, Cl, Br, or I. Among the Group 15 element and the Group 16 element, the Group 16 element is preferable. Among the Group 16 elements, oxygen and sulfur are preferable examples. Examples of the radical containing the Group 16 element and the Group 17 element include halogen oxide radicals such as a $F_2O^-$ (difluoric oxygen radical), an $F_2O_2^-$ (difluoric dioxygen radical), a $ClO_2^-$. (chlorine dioxide radical), a $BrO_2^-$ (bromine dioxide radical), and an $I_2O_5^-$ (iodine oxide (V)).

(3) Reaction System

As described above, the reaction system in the reaction step may be, for example, a gas reaction system or a liquid reaction system.

(3A) Gas Reaction System

When the reaction system is a gas reaction system, for example, the polymer may be disposed in the gas reaction system containing the compound radical and irradiated with light. The gas reaction system is only required to contain the radical, for example, and the type of the gas phase in the gas reaction system is not particularly limited, and is air, nitrogen, a rare gas, oxygen, or the like.

In the present invention, for example, the compound radical may be introduced into the gas reaction system or the compound radical may be generated in the gas reaction system before or simultaneously with the reaction step. In the former case, for example, a gas containing the compound radical may be introduced into the gas phase. In the latter case, for example, as described below, the compound radical may be introduced by transferring the compound radical generated in a liquid reaction system for radical generation into a gas phase.

As a specific example, when the compound radical is the chlorine dioxide radical, the chlorine dioxide radical can be present in the gas phase, for example, by introducing chlorine dioxide gas into the gas phase. The chlorine dioxide radicals can also be generated in the gas phase, for example by electrochemical methods.

(3B) Liquid Reaction System

When the reaction system is a liquid reaction system, it contains, for example, an organic phase. The liquid reaction system may be, for example, a one-phase reaction system containing only the organic phase or a two-phase reaction system containing the organic phase and the aqueous phase.

(3B-1) Organic Phase

As described above, the polymer is disposed in the organic phase. For example, the organic phase is a phase of an organic solvent containing the compound radical and in which the polymer is disposed.

The organic solvent is not particularly limited. For example, only one type of the organic solvent may be used, or two or more types may be used in combination. In the present invention, the organic solvent may be, for example, a hydrocarbon solvent, a halogenated solvent, a fluorous solvent, or the like, as described above. When the liquid reaction system is the two-phase reaction system, the organic solvent is preferably, for example, a solvent that can form the two-phase system, i.e., a solvent that separates from an aqueous solvent constituting the aqueous phase described below, or a solvent that is poorly soluble or insoluble in the aqueous solvent.

The hydrocarbon solvent is not particularly limited, and for example, an aromatic system is preferable, and specific examples thereof include n-hexane, cyclohexane, benzene, toluene, o-xylene, m-xylene, and p-xylene. The hydrocarbon solvent may also serve as the raw material compound (e.g., the hydrocarbon or a derivative thereof). The hydrocarbon solvent is preferably an aromatic hydrocarbon solvent, for example.

The "halogenated solvent" refers, for example, to a solvent in which all or most of the hydrogen atoms of a hydrocarbon have been substituted with halogen. The halogenated solvent may be, for example, a solvent in which 50% or more, 60% or more, 70% or more, 80% or more, or 90% or more of the number of hydrogen atoms of the hydrocarbon is substituted with halogen. The halogenated solvent is not particularly limited, and examples thereof include methylene chloride, chloroform, carbon tetrachloride, carbon tetrabromide, and a fluorous solvent described below.

The "fluorous solvent" is one of the aforementioned halogenated solvents, and is, for example, a solvent in which all or most of the hydrogen atoms of a hydrocarbon have been substituted with fluorine atoms. The fluorous solvent may be, for example, a solvent in which 50% or more, 60% or more, 70% or more, 80% or more, or 90% or more of the number of hydrogen atoms of the hydrocarbon is substituted with fluorine atoms. When the fluorous solvent is used in the present invention, for example, since the reactivity of the solvent itself is low, there is an advantage that side reactions can be further suppressed or prevented. Examples of the side reaction include an oxidation reaction of the solvent, a hydrogen extraction reaction or a halogenation reaction (for example, a chlorination reaction) of the solvent due to the radical, and a reaction between a radical derived from the raw material compound and the solvent (for example, a reaction between an ethyl radical and the solvent in the case where a hydrocarbon group at a side chain or an end of the polymer is an ethyl group). Since the fluorous solvent is not miscible with water, it is suitable, for example, for forming the two-phase reaction system.

Examples of the fluorous solvent include solvents represented by the following chemical formulae (F1) to (F6), and among them, for example, a solvent represented by the chemical formula (F1) (n=4, $CF_3(CF_2)_4CF_3$), is preferable.

$F_3C—(CF_2)_n—CF_3$ n = 4, boiling point = 60° C.
n = 5, boiling point = 82° C.
n = 6, boiling point = 104° C.
n = 7, boiling point = 125° C.

(F1)

$F_3C(F_2C)_n$ \ N / $(CF_2)_nCF_3$
        |
     $(CH_2)_nCF_3$ n = 1 or 4
n = 1, boiling point = 135° C.

(F2)

boiling point = 81° C.

(F3)

boiling point = 76° C.

(F4)

boiling point = 104° C.

(F5)

boiling point = 142° C.

(F6)

The boiling point of the organic solvent is not particularly limited. The organic solvent can be appropriately selected depending on, for example, the temperature condition of the reaction step. In the reaction step, when the reaction temperature is set to a high temperature, a solvent having a high boiling point can be selected as the organic solvent. In the present invention, for example, as described below, heating is not indispensable, and, for example, the reaction can be performed, at ordinary temperature and normal pressure. In such a case, the organic solvent does not need to be, for example, a solvent having a high boiling point, and a solvent having a low boiling point can be used from the viewpoint of ease of handling.

The organic phase may contain, for example, only the polymer, the compound radical, and the organic solvent, or may further include other components. The other components are not particularly limited and examples thereof include a Brønsted acid, a Lewis acid, and oxygen ($O_2$). In the organic phase, for example, the other components may be dissolved in the organic solvent or may be undissolved. In the latter case, the other component may be dispersed or precipitated in the organic solvent, for example.

The organic phase contains the compound radicals as described above. The compound radical can be caused to be contained in the organic phase by, for example, generating it in a region other than the organic phase and extracting it by the organic phase. That is, in the case where the reaction system is a one-phase reaction system containing only an organic phase, for example, the compound radical is separately generated in a region other than the organic phase which is the reaction system, the generated compound radical is extracted by the organic phase, and the extracted organic phase containing the compound radical is subjected to the reaction step as the reaction system. The generation of the compound radical can be performed, for example, in a separately prepared aqueous phase as described below. On the other hand, in the case where the liquid reaction system is a two-phase reaction system containing the organic phase and the aqueous phase, for example, the compound radical is generated in the aqueous phase, the generated compound radical is extracted from the aqueous phase in the organic phase, and the aqueous phase and the organic phase containing the compound radical are subjected to the reaction step as the two-phase reaction system.

The polymer is disposed in the organic phase. When the polymer is the molded body, it is preferable to fix the molded body in the organic phase, for example, from the viewpoint of efficiency of a reaction treatment described below.

(3B-2) Aqueous Phase

The aqueous phase is, for example, a phase of an aqueous solvent. The aqueous solvent is, for example, a solvent that is separated from the solvent used in the organic phase. Examples of the aqueous solvent include water such as $H_2O$ and $D_2O$.

The aqueous phase may contain any component, for example, a Lewis acid, a Brønsted acid, a radical source, or the like, as described below. In the aqueous phase, these optional components may be, for example, dissolved or undissolved in the aqueous solvent. In the latter case, the optional component may be dispersed or precipitated in the aqueous solvent, for example.

(4) Reaction Step

In the present invention, the reaction step is a step of irradiating the reaction system containing the polymer with light in the presence of the compound radical. The polymer is disposed in the reaction system, and the polymer can be modified by the light irradiation. Specifically, according to the present invention, the polymer can be easily modified by light irradiation in the presence of the compound radical. According to the present invention, for example, by adjusting the amount of the compound radical, the length of time of light irradiation, or the like, the degree of modification of the polymer (for example, the degree of modification of oxidation, etc.) can be easily adjusted. Thus, for example, decomposition of the polymer due to excessive oxidation or the like can be prevented, and, for example, the properties inherent in the polymer can be prevented from being impaired.

In the reaction step, when the reaction system containing the polymer and the radical is irradiated with light, the compound radical irradiated with light is predicted to be, for example, as shown in FIG. 1. FIG. 1 shows a chlorine dioxide radical ($ClO_2^-$), which is the oxide radical, as an example of the compound radical. FIG. 1 shows the result of the calculation by UCAM-B3LYP/6-311+G(d,p) def2TZV. The view on the left side of FIG. 1 shows the state of a chlorine dioxide radical ($ClO_2^-$) molecule before light irradiation, and the view on the right side of FIG. 1 shows the state of a chlorine dioxide radical ($ClO_2^-$) molecule after light irradiation. As shown in FIG. 1, before the light irradiation, two oxygen atoms 0 are each bound to a chlorine atom Cl, and the bond length of Cl—O is 1.502 Å (0.1502 nm). On the other hand, after the light irradiation, only one of the oxygen atoms 0 is bound to a chlorine atom Cl, the bond length of Cl—O is 2.516 Å (0.2516 nm), and the other of the oxygen atoms is bound to the oxygen atom that is bound to chlorine atom Cl. It is considered that, thereby the Cl—O bond is cleaved and a chlorine radical (Cl.) and a dioxygen molecule ($O_2$) are generated. The chlorine radical serves as a hydrogen extractant with respect to the polymer and the dioxygen molecule serves as an oxidizing agent with respect to the polymer. Thus, the chlorine radical, for example, extracts hydrogen from the inside of the end, side chain, or main chain of the polymer to generate a radical derived from the polymer, and the dioxygen molecule oxidizes the radical derived from the polymer to oxidize the inside of the end, side chain, or main chain. It is to be noted, however, that FIG. 1 shows an example of the prediction of the calculation result and by no means limits the present invention.

In the reaction step, when the side chain of the polymer is a methyl group, the methyl group (—$CH_3$) is oxidized to, for example, at least one of a hydroxymethyl group (—$CH_2OH$), a formyl group (—CHO), and a carboxy group (—COOH). This presumes the following mechanism. That is, the radical of the Group 17 element (e.g., chlorine radical (Cl.)) and the molecule of the Group 15 element or the Group 16 element (e.g., dioxygen molecule) are generated from the compound radical (e.g., chlorine dioxide radical) by light irradiation. The methyl group (—$CH_3$) of the polymer is modified to a methylene radical (—$CH_2$.) owing to the radical of the Group 17 element (e.g., chlorine radical ($Cl^{31}$)) serving as a hydrogen extractant, and then is modified into a hydroxymethyl group (—$CH_2OH$) owing to the molecule of the Group 15 element or the Group 16 element (e.g., dioxygen molecule ($O_2$)) serving as an oxidizing agent. The hydroxymethyl group (—$CH_2OH$) is further oxidized to a formyl group (—CHO) or a carboxy group (—COOH). In the case where the polymer is polypropylene (PP), oxidation is possible as, for example, the following formula.

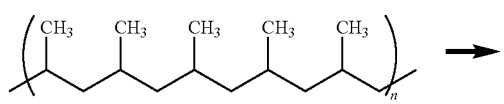

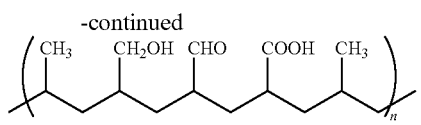

In the reaction step, when the side chain of the polymer is an ethyl group, the ethyl group (—$CH_2CH_3$) is oxidized to, for example, a hydroxyethyl group (—$CH_2CH_2OH$), an acetaldehyde group (—$CH_2CHO$), or a carboxymethyl group (—$CH_2COOH$).

In the reaction step, the conditions of light irradiation are not particularly limited. The wavelength of the light is not particularly limited, and the lower limit is, for example, 200 nm or more and the upper limit is, for example, 800 nm or less. The light irradiation time is not particularly limited, and the lower limit is, for example, 1 minute or more and the upper limit is, for example, 1000 hours. The reaction temperature is not particularly limited, and the lower limit is, for example, 0° C. or more, the upper limit is, for example, 100° C. or less or 40° C. or less, and the temperature is, for example, in the range from 0 to 100° C. or 0 to 40° C. The atmospheric pressure at the time of reaction is not particularly limited, and the lower limit is, for example, 0.1 MPa or more, the upper limit is, for example, 100 MPa or less, 10 MPa or less, or 0.5 MPa or less, and the atmospheric pressure is, for example, in the range from 0.1 to 100 MPa, 0.1 to 10 MPa, or 0.1 to 0.5 MPa. As the reaction conditions of the reaction step, for example, the temperature is in the range from 0 to 40° C. and the pressure is in the range from 0.1 to 0.5 MPa. According to the present invention, for example, the above-described reaction step or all the steps including the above-described reaction step can be performed under ordinary temperature (room temperature) and normal pressure (atmospheric pressure) without heating, pressurizing, depressurizing, or the like. The term "room temperature" is not particularly limited, and is, for example, 5 to 35° C. Therefore, even if the polymer includes, for example, a polymer having low heat resistance, it can be applied to the present invention. According to the present invention, for example, the reaction step or all the steps including the reaction step can be performed in the atmosphere without performing inert gas substitution or the like.

The light source of the light irradiation is not particularly limited, and, for example, visible light included in natural light such as sunlight can be used. When natural light is used, for example, excitation can be easily performed. As the light source, for example, a light source such as a xenon lamp, a halogen lamp, a fluorescent lamp, or a mercury lamp may be used instead of or in addition to the natural light. In the light irradiation, for example, a filter for cutting wavelengths other than the necessary wavelengths can be used as appropriate.

Further, according to the present invention, when the polymer is the molded body, for example, by irradiating the molded body with light only in a predetermined region, only a desired region can be modified. A control method for such selective light irradiation is not particularly limited, and for example, only a predetermined region may be irradiated with light, or a region not to be irradiated with light may be masked and then the entire region may be irradiated with light.

When the reaction system is the liquid reaction system, as described above, for example, the reaction system may be a one-phase reaction system consisting only of the organic phase or a two-phase reaction system containing the organic phase and the aqueous phase. In the former case, for example, the reaction step can be performed by irradiating the one-phase reaction system with light. In the latter case, for example, only the organic phase may be irradiated with light or the two-phase reaction system may be irradiated with light, thereby irradiating the organic phase with light to perform the reaction step.

When the reaction system is the liquid reaction system, in the reaction step, it is preferable that the liquid reaction system be irradiated with light, for example, in a state in which oxygen is dissolved in the liquid reaction system. When the liquid reaction system is the one-phase system, for example, oxygen is dissolved in the organic phase. When the liquid reaction system is the two-phase system, for example, oxygen is dissolved in at least one of the organic phase and the aqueous phase, and preferably, in the aqueous phase. Specific examples of the light irradiation under the above-described conditions include, for example, a method of irradiating the liquid reaction system with light while bringing the liquid reaction system into contact with air or an oxygen gas and a method of irradiating the liquid reaction system with light while introducing air or an oxygen gas into the liquid reaction system. The former method can be carried out, for example, by stirring the liquid reaction system as described above. The latter method can be performed, for example, by inserting a tip of a tube or the like into the liquid reaction system and feeding air or oxygen through the tube. When the liquid reaction system includes oxygen, for example, a modifying reaction (for example, oxidation reaction) of the polymer can be further accelerated.

According to the present invention, by a very simple method of only performing light irradiation in the presence of the compound radical in the reaction step, the radical of the Group 17 element (e.g., chlorine atom radical $Cl^{31}$) and the molecule of the Group 15 element or the Group 16 element (e.g., dioxygen molecule $O_2$) can be generated and the reaction (e.g., oxidizing reaction) with respect to the polymer can be performed to modify the polymer. Even under extremely mild conditions such as ordinary temperature and normal pressure, for example, the polymer can be efficiently changed and modified by such a simple method.

According to the present invention, for example, a modified polymer in which the polymer is modified can be obtained without using a toxic heavy metal catalyst or the like. Therefore, as described above, for example, the reaction can be carried out under extremely mild conditions and the modified polymer can be efficiently obtained by a method having a very small environmental load.

As a method of oxidizing a polymer, a method of adding a compound such as maleic acid or acrylic acid to a polymer such as PE or PP by using peroxide has been known. However, since these compounds are accompanied by a cross-linking reaction, a decomposition reaction, and the like of PE and PP, the compounds are only introduced at about several weight %, and the introduction rate is low in practical use. In contrast, according to the present invention, the content of oxidized sites in the polymer can be relatively improved as compared to the conventional method.

(6) Compound Radical Generating Step

The present invention may further include, for example, a step of generating a compound radical for generating the compound radical. In the present invention, the compound radical generating step can be performed, for example, before or simultaneously with the reaction step. The method of generating the compound radical is not particularly limited.

In the compound radical generating step, for example, the compound radical may be generated using a reaction system for radical generation. The reaction system for radical generation may be used as it is as the liquid reaction system in the reaction step, for example, after the compound radical has generated. An aspect in which the reaction system for radical generation is used as the liquid reaction system in the reaction step is described below. The present invention, however, is not limited thereto.

When the reaction system is the liquid reaction system and, as described above, is a reaction system containing the aqueous phase, for example, the aqueous phase may contain a source of the compound radical, and the compound radical may be generated from the source of the compound radical in the compound radical generating step. The aqueous phase is, for example, a phase of an aqueous solvent containing the source of the compound radical, and the aqueous solvent is the same as described above. When the compound radical generated in the aqueous phase is hydrophobic, for example, the compound radical can be transferred to the organic phase by using a two-phase reaction system containing the organic phase and the aqueous phase. As described above, when the reaction step is performed in the gas reaction system, the reaction system for generating the compound radical may be, for example, only an aqueous phase or a two-phase reaction system of an aqueous phase and an organic phase. In the case where the compound radical is hydrophobic, for example, since the compound radical generated in the aqueous phase can be directly transferred to the gas phase, the reaction system for radical generation may be only the aqueous phase.

The source of the compound radical is not particularly limited, and can be appropriately selected depending on, for example, the type of the compound radical. As the source of the compound radical, for example, only one type may be used, or two or more of types may be used in combination.

When the compound radical is a radical containing the Group 16 element and the Group 17 element, the compound radical may be, for example, an oxide radical of the halogen. In this case, the source may be, for example, a compound containing the Group 16 element and the Group 17 element corresponding to the compound radical. Specifically, the source may be, for example, halous acid ($HXO_2$) or salt thereof. The salt of the halous acid is not particularly limited, and may be, for example, metal salt. Examples of the metal salt include alkali metal salt, alkaline earth metal salt, and rare earth salt. When the compound radical is the chlorine dioxide radical, the source is not particularly limited, and may be, for example, chlorite ($HClO_2$) or salt thereof. Specifically, examples of the source include sodium chlorite ($NaClO_2$), lithium chlorite ($LiClO_2$), potassium chlorite ($KClO_2$), magnesium chlorite ($Mg(ClO_2)_2$), and calcium chlorite ($Ca(ClO_2)_2$). Among them, sodium chlorite ($NaClO_2$) is preferred from the viewpoint of cost and ease of handling. For example, the same method can be used for sources of other compound radicals. Specifically, examples of the sources of other compound radicals include bromate salt such as sodium bromite and iodite salt such as sodium bromite.

The concentration of the source in the aqueous phase is not particularly limited. When the source is the compound, in terms of the compound ion concentration, the lower limit of the concentration thereof is 0.0001 mol/L or more and the upper limit thereof is 1 mol/L or less, for example, and, in terms of the number of moles of the compound ion, the lower limit of the concentration thereof is 1/100000 times or more of the number of moles of the raw material and the upper limit of the concentration thereof is 1000 times or less of the number of moles of the raw material, for example.

When the source is halous acid or halite (e.g., chlorous acid or chlorite), in terms of a halite ion (e.g., chlorite ion ($ClO_2^-$)) concentration, the lower limit of the concentration thereof is 0.0001 mol/L or more and the upper limit of the concentration thereof is 1 mol/L or less, for example, and in terms of the number of moles of the halite ion (e.g., chlorite ion ($ClO_2^-$)), the lower limit of the concentration thereof is 1/100000 times or more of the number of moles of the raw material and the upper limit of the concentration thereof is 1000 times or less of the number of moles of the raw material, for example. The above-described concentrations can be applied also to other sources, for example.

The aqueous phase may further contain, for example, at least one of a Lewis acid and a Brønsted acid. The aqueous phase may contain, for example, only one or both of the Lewis acid and the Brønsted acid, or one substance may serve as both of the Lewis acid and the Brønsted acid. Only one type of the Lewis acid and the Brønsted acid may be used, or two or more types may be used in combination. In the present invention, the "Lewis acid" means, for example, a substance which serves as a Lewis acid with respect to the source of the compound radical.

In the aqueous phase, the concentration of at least one of the Lewis acid and the Brønsted acid is not particularly limited, and can be appropriately determined depending on, for example, the type of the polymer to be modified. The lower limit of the concentration is 0.0001 mol/L or more and the upper limit of the concentration is 1 mol/L or less, for example.

The Lewis acid is not particularly limited, and may be, for example, an organic substance or an inorganic substance. Examples of the organic material include ammonium ions and organic acids (e.g., carboxylic acid). The inorganic substance may include one or both of metal ions and nonmetal ions. The metal ion may include one or both of typical metal ions and transition metal ions. Examples of the inorganic substance include alkaline earth metal ions (e.g., $Ca^{2+}$), rare earth metal ions, $Mg^{2+}$, $Sc^{3+}$, $Li^+$, $Fe^{2+}$, $Fe^{3+}$ $Al^{3+}$, silicate ions, and borate ions, and any one type of or two or more types of them may be used. Examples of the alkali earth metal ion include ions of calcium, strontium, barium, and radium. More specifically, examples of the alkali earth metal ion include $Ca^{2+}$, $Sr^{2+}$, $Ba^{2+}$, and $Ra^{2+}$. Furthermore the "rare earth metal" is a generic name of a set of seventeen elements, specifically, two elements such as scandium$_{21}$Sc and yttrium$_{39}$Y and fifteen elements (lanthanoids) from lanthanum$_{57}$La to lutetium$_{71}$Lu. Examples of the rare earth ion include trivalent cations corresponding to the seventeen elements. The counter ion of the Lewis acid is not particularly limited and examples thereof include a trifluoromethanesulfonate ion (also referred to as "$CF_3SO_3^-$" or "OTf$^-$"), a trifluoroacetate ion ($CF_3COO^-$), an acetate ion, a fluoride ion, a chloride ion, a bromide ion, an iodide ion, a sulfate ion, a hydrogen sulfate ion, a sulfite ion, a nitrate ion, a nitrite ion, a phosphate ion, and a phosphite ion. For example, the Lewis acid may be scandium triflate ($Sc(OTf)_3$).

Examples of the Lewis acid (including counter ions) include $AlCl_3$, $AlMeCl_2$, $AlMe_2Cl$, $BF_3$, $BPh_3$, $BMe_3$, $TiCl_4$, $SiF_4$, and $SiCl_4$, and any one type of or two or more types of them may be used. It is to be noted that the "Ph" indicates a phenyl group and the "Me" indicates a methyl group.

The Lewis acidity of the Lewis acid is not particularly limited, and is, for example, 0.4 eV or more. The upper limit of the Lewis acidity is not particularly limited and is, for example, 20 eV or less. It is to be noted that the Lewis acidity can be measured, for example, by the method described in Ohkubo, K.; Fukuzumi, S. Chem. Eur. J., 2000, 6, 4532, J. Am. Chem. Soc. 2002, 124, 10270-10271 or the method described in J. Org. Chem. 2003, 68, 4720-4726. Specifically, the Lewis acidity can be measured by the following method.

(Measurement Method of Lewis Acidity)

As to acetonitrile (MeCN) that contains cobalt tetraphenylporphyrin (CoTPP), saturated $O_2$, and an object whose Lewis acidity is to be measured (e.g., a cation of a metal or the like, represented by $M^{n+}$ in the following chemical reaction formula (1a)) in the following chemical reaction formula (1a), the change of the ultraviolet-visible absorption spectrum is measured at room temperature. On the basis of the obtained reaction rate constant ($k_{cat}$), the $\Delta E$ value (eV), which is an indicator of the Lewis acidity, can be calculated. The relatively higher the $k_{cat}$, the relatively stronger the Lewis acidity. Furthermore, the Lewis acidity of an organic compound can be estimated from the energy level of the lowest unoccupied molecular orbital (LUMO) calculated by the quantum chemical calculation, for example. Regarding the energy level, the higher the value at the positive side, the stronger the Lewis acidity.

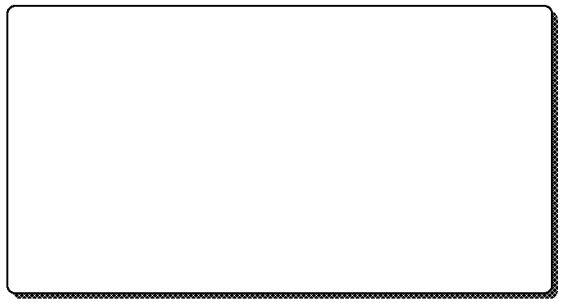

(1a)

The Brønsted acid is not particularly limited, and may be, for example, an inorganic acid or an organic acid. Specific examples of the Brønsted acid include trifluoromethanesulfonic acid, trifluoroacetic acid, acetic acid, hydrofluoric acid, hydrochloric acid, hydrobromic acid, hydroiodic acid, sulfuric acid, sulfurous acid, nitric acid, nitrous acid, phosphoric acid, and phosphorous acid. The acid dissociation constant $pK_a$ of the Brønsted acid is, for example, 10 or less. The lower limit of the $pK_a$ is not particularly limited, and is, for example, −10 or more.

The aqueous phase contains, for example, the compound ion and a Brønsted acid, and is preferably, for example, an aqueous phase in which the compound and a Brønsted acid (e.g., hydrochloric acid) are dissolved in an aqueous solvent. As a specific example, when the compound radical is a chlorine dioxide radical, the aqueous phase preferably contains, for example, chlorite ion ($ClO_2^-$) and a Brønsted acid, and is preferably, for example, an aqueous phase in which the sodium chlorite ($NaClO_2$) and a Brønsted acid (e.g., hydrochloric acid) are dissolved in an aqueous solvent.

In the aqueous phase, for example, the Lewis acid, the Brønsted acid, the radical source, and the like may be dissolved or undissolved in the aqueous solvent. In the latter case, they may be dispersed or precipitated in the aqueous solvent, for example.

The aqueous phase is preferably in a state in which oxygen ($O_2$) is dissolved, for example. The timing of dissolving the oxygen ($O_2$) in the aqueous phase is not particularly limited, and may be, for example, before or after the generation of the compound radicals, or may be before or during the reaction step. As a specific example, oxygen may be dissolved by blowing air or oxygen gas into at least one of the aqueous phase and the organic phase before or after adding the source of the compound radical, the Lewis acid, the Brønsted acid, or the like. At least one of the aqueous phase and the organic phase may be saturated with oxygen ($O_2$), for example. When at least one of the aqueous phase and the organic phase contains oxygen, for example, modification of the polymer (for example, oxidation of the polymer) can be further accelerated in the reaction step.

The compound radical generating step is not particularly limited, and for example, the compound radical (e.g., chlorine dioxide radical) can be naturally generated from the compound ion (e.g., chlorite ion) by causing the aqueous solvent to contain the source of the compound radical. For example, it is preferable that the source be dissolved in the aqueous solvent in the aqueous phase, and it is preferable that the aqueous phase be left to stand still. In the compound radical generating step, the aqueous phase can further accelerate the generation of the compound radical by, for example, causing at least one of the Lewis acid and the Brønsted acid to coexist. In the compound radical generating step, the compound radical can be generated, for example, by irradiating the aqueous phase with light. It is to be noted that the compound radical can also be generated, for example, by simply causing the aqueous phase to stand still without irradiating the aqueous phase with light. Since the compound radical generated from the source in the aqueous phase in the reaction system is poorly soluble in water, it is dissolved in the organic phase in the reaction system.

The mechanism by which the compound radical is generated from the compound ion in the aqueous phase is presumed, for example, as in the scheme 1 below. In the following scheme, chlorite ion as the compound ion and chlorine dioxide radical as the compound radical are given as specific examples. The scheme 1 below is an example of a presumed mechanism and does not limit the present invention in any way. The first (uppermost) reaction formula in the scheme 1 below shows a disproportionation reaction of chlorite ion ($ClO_2^-$), and it is considered that the presence of at least one of a Lewis acid and a Brønsted acid in an aqueous phase facilitates the movement of the equilibrium to the right. The second (middle) reaction formula in the scheme 1 below shows a dimerization reaction, and hypochlorite ion ($ClO^-$) generated in the first reaction formula reacts with chlorite ion to generate dichlorine dioxide ($Cl_2O_2$). It is considered that the greater the protons $H^+$ in an aqueous phase, i.e., the more acidic, the easier the process is to proceed. The third (lowermost) reaction formula in the scheme 1 below shows radical generation. In this reaction, the dichlorine dioxide generated in the second reaction formula reacts with a chlorite ion to produce a chlorine dioxide radical.

Scheme 1

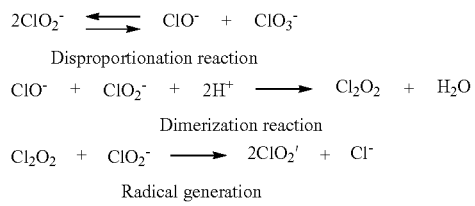

When the reaction system is the liquid reaction system and is a two-phase reaction system containing the organic phase and the aqueous phase, after generating the compound radical as described above, the liquid reaction system may be directly subjected to the above-described reaction step. That is, the reaction step of modifying the polymer may be performed by further irradiating the liquid reaction system in which the compound radical is generated with light. In this case, for example, by irradiating the liquid reaction system with light, the compound radical generating step and the reaction step can be performed successively. In the present invention, for example, better reaction efficiency can be obtained by performing the compound radical generating step and the reaction step in the two-phase reaction system.

On the other hand, when the reaction system in the reaction step is the liquid reaction system and is a one-phase reaction system containing only the organic phase, for example, the compound radical may be generated in the aqueous phase by the above-described method and the generated compound radical may be dissolved (extracted) in the organic phase, and then the aqueous phase may be removed and the organic phase containing the compound radical may be subjected to the reaction step as the one-phase reaction system.

Figure 2:
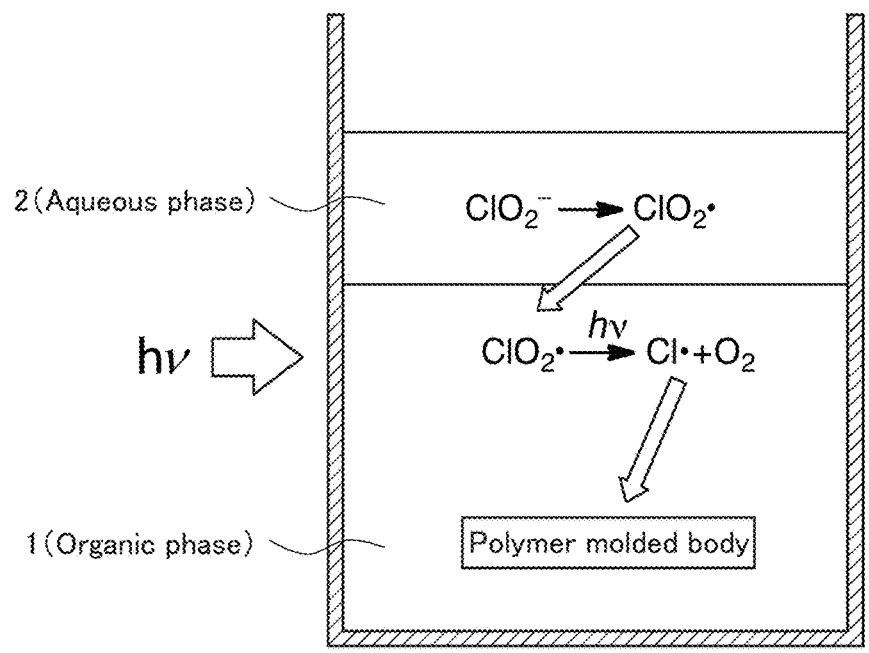
FIG. 2 is a diagram schematically showing an example of the reaction step in the modifying method of the present invention.

FIG. 2 schematically shows an example of the compound radical generating step and the reaction step using the two-phase reaction system. In FIG. 2, the chlorine dioxide radical as the compound radical and the molded body as the polymer are shown as specific examples, however, the present invention is not limited in any way to these examples. As shown in FIG. 2, in the reaction system, two layers of an aqueous layer (the aqueous phase) and an organic layer (the organic phase) are separated from each other in a reaction vessel, and are in contact with each other only at an interface. The upper layer is an aqueous layer (the aqueous phase) 2, and the lower layer is an organic layer (the organic phase) 1. It is to be noted that, while FIG. 2 is a cross-sectional view, for viewability, hatching of the aqueous layer 2 and organic layer 1 is omitted. As shown in FIG. 2, chlorite ion ($ClO_2^-$) in the aqueous layer (aqueous phase) 2 reacts with an acid to generate a chlorine dioxide radical ($ClO_2^-$). Since the chlorine dioxide radical ($ClO_2^-$) is poorly soluble in water, it is dissolved in the organic phase 1. Subsequently, by irradiating the organic layer 1 containing the chlorine dioxide radical ($ClO_2^-$) with light and applying light energy hv (h denotes the Planck constant and v denotes the light frequency) to the organic layer, a chlorine dioxide radical ($ClO_2^{31}$) in the organic layer 1 is decomposed to generate a chlorine radical ($Cl^-$) and a dioxygen molecule ($O_2$). As a result, the polymer molded body in the organic layer (organic phase) 1 is oxidized and the surface is modified. FIG. 2 is merely an illustrative example and does not limit the present invention in any way.

In FIG. 2, while the aqueous layer 2 is the upper layer and the organic layer 1 is the lower layer, for example, if the organic layer 1 has lower density (specific gravity) than the aqueous layer 2, the organic layer 1 serves as the upper layer. When the polymer is the molded body, for example, it may be immobilized in the reaction vessel such that the polymer molded body is disposed in the upper organic layer. In this case, the site where the polymer molded body is immobilized may be provided in the reaction vessel or may be provided outside the reaction vessel, for example. In the latter case, for example, the polymer molded body may be suspended from the outside and immersed in the organic layer.

While FIG. 2 shows the two-phase reaction system, in the producing method of the present invention, the reaction step may be performed in a one-phase reaction system containing only an organic phase. In this case, for example, an aqueous phase containing the source of the compound radical is separately prepared, the compound radical is generated in the aqueous phase, and then the organic phase is mixed with the aqueous phase to dissolve (extract) the compound radical generated in the aqueous phase into the organic phase. Then, the aqueous phase and the organic phase are separated, the organic phase is recovered, and the polymer is disposed in the organic layer, thereby obtaining a one-phase reaction system. The reaction step is carried out by irradiating the one-phase reaction system alone with light in the presence of the compound radical.

The modifying method of the present invention may further include a step of introducing a functional group at the changed site in the polymer, for example. The changed site (modified site) in the polymer may be, for example, a site into which an element as described above has been introduced, and is, as a specific example, an oxidized site.

According to the modifying method of the present invention, as described above, the physical properties of the polymer can be changed by modifying or functionalizing the polymer by the reaction step.

According to the modifying method of the present invention, various functions can be imparted to the polymer, for example, by further introducing a functional group.

According to the modifying method of the present invention, for example, the physical properties can be changed by the functionalization. The functionalization may be performed, for example, by applying a drug to the polymer. Thus, by changing the physical properties of the polymer, it is possible to broaden the application of the polymer such as to a delivery material, a release material, a culture component of a cell such as an iPS cell, and the like, for example.

According to the modifying method of the present invention, for example, extraction of the polymer and decomposition of the polymer can be achieved by changing the physical properties as described above.

According to the modifying method of the present invention, it is also possible to modify the polymer to be super-water repellent, super-hydrophilic, conductive, insulating, luminescent, refractive, or the like, for example, by the functionalization. According to the interfacial modifying method of the present invention, it is also possible to strengthen or weaken the degree of properties of the polymer, for example, by the functionalization. Examples of the properties include water repellency, hydrophilicity, conductivity, insulation, luminescence, refraction, and the like.

The modifying method of the present invention makes it possible to modify the polymers to be used in various fields to have desired properties, for example. As a specific example of the field, first, the field of organic EL (electroluminescence) can be given. In this case, for example, the polymer can be modified from an insulating property to a conductive property, or the degree of conductivity can be strengthened or weakened, and examples of the polymer include a phenol resin, an epoxy resin, and a diallyl phthalate resin. In addition, it is possible to introduce luminescence into the polymer by introducing luminescent molecules or the like, and examples of the polymer include polycarbonate (PC), polyarylate (PAR) such as amorphous polyarylate, and polyethersulfonic acid (PES). When the polymer is the molded body, the molded body can be modified into, for example, a light emitting layer or a hole layer. In the case of the light emitting layer, the polymer can be, for example, polyparaphenylene vinylene (PPV), polythiophene (PAT), polyfluorene (PF), polyparaphenylene (PPP), or the like. In the case of the hole layer, the polymer can be, for example, PEDOT/PSS, polyaniline/PSS, or the like.

Examples of the above-described field include optical fields such as cameras, movies, players of CDs, DVDs, and the like, televisions such as a projection television, contact lenses, glasses, cells such as blood analysis cells, and covers of LED lenses. The field can also be, for example, the field of regenerative medicine.

Next, as described above, the second method for modifying the polymer of the present invention includes the step of: irradiating a reaction system containing a polymer with light in a presence of a compound, wherein the compound is a compound containing one element selected from the group consisting of Group 15 elements and Group 16 elements, a Group 17 element, and a Group 1 element.

In the second modifying method of the present invention, the polymer in the reaction system is irradiated with light in the presence of the compound, thereby modifying the polymer. The second modifying method only requires that light irradiation is performed in the presence of the compound, and, unlike the first modifying method of the present invention, whether the compound radical is generated or not is not particularly limited, for example. Regarding the second modifying method of the present invention, reference can be made to the description as to the first modifying method of the present invention unless otherwise stated.

In the second modifying method of the present invention, for example, the Group 15 element is at least one of N and P, the Group 16 element is at least one selected from the group consisting of O, S, Se, and Te, the Group 17 element is at least one selected from the group consisting of F, Cl, Br, and I, and the Group 1 element is at least one selected from the group consisting of H, Li, Na, K, Rb, and Cs.

The second modifying method of the present invention further includes the step of: generating the compound, wherein in the compound generating step, at least one of a Lewis acid or a Brønsted acid containing a Group 1 element is caused to act on a compound ion containing one element selected from the group consisting of the Group 15 elements and the Group 16 elements, and the Group 17 element., for example In the second modifying method of the present invention, the reaction step is the same as the reaction step in the first modifying method except that light irradiation is performed in the presence of the compound, for example.

Next, as described above, the method for producing a modified polymer of the present invention includes the step of modifying a polymer, wherein, in the modifying step, the polymer is modified by the modifying method of the present invention. The modifying method in the producing method of the present invention is, for example, the first modifying method or the second modifying method. The producing method of the present invention is characterized in that the polymer is modified by the modifying method of the present invention, and other steps and conditions are not particularly limited. Regarding the producing method of the present invention, reference can be made to the description as to the modifying method of the present invention.

The modifying method of the present invention and the producing method of the present invention using the same are new methods.

As described above, the modified polymer of the present invention includes at least one element ($\alpha$) selected from the group consisting of Group 15 elements and Group 16 elements, and Group 17 element ($\beta$); and a site in which a ratio between the element ($\alpha$)% [C$\alpha$] to all elements excluding hydrogen and helium in the polymer specified by an XPS method and the element ($\beta$)% [C$\beta$] to all elements excluding hydrogen and helium in the polymer specified by an XPS method satisfies the following condition.

$$5000 \geq [C\alpha]/[C\beta] > 0$$

The modified polymer of the present invention can be obtained, for example, by the method for modifying a polymer of the present invention and a method for producing a modified polymer of the present invention.

The XPS method is, as disclosed in the examples described below, performed by using a commercially available device (product name: AXIS-NOVA, KmtoS Corporation) under the measurement conditions as follows: monochromatization AlK$\alpha$ (1486.6 eV) is used as an X-ray source and an analytical area is 300 µm×700 µm (set values). In addition, by this measurement method, the contents of the Group 15 element, the Group 16 element, and the Group 17 element of the periodic table in the modified polymer of the present invention are specified. When the modified polymer of the present invention is in the form of a solid such as a molded body, as described above, the XPS measurement is applied to the surface thereof. In this case, the modified polymer of the present invention is characterized in that a part or the whole of the surface thereof satisfies the above-described requirements specified by the XPS measurement. The site where the solid modified polymer of the present invention satisfies the above-described provisions regarding the contents of the Group 15 element, the Group 16 element, and the Group 17 element may be a part of the surface thereof, and is preferably 0.1% or more, more preferably 1% or more, still more preferably 5% or more, and particularly preferably 7% or more of the whole surface area. Of course, in the modified polymer of the present invention, the upper limit value of the proportion of the site satisfying the above-described provision is 100% (i.e., whole surface).

On the other hand, when the modified polymer of the present invention is in a liquid state as described above, since there is no concept of a surface, a thin film-like sample is produced by, for example, a casting method, a spin coating method, or the like, and the thus obtained thin film-like sample is subjected to the XPS measurement under the above-described conditions, whereby the contents of the Group 15 element, the Group 16 element, and the Group 17 element of the periodic table are specified.

The measurement result of the XPS is specified by a conventional method on the basis of the information of the obtained spectrum chart. For example, peaks may be observed at two or more positions with respect to one type of element. In such a case, a peak on the high energy side is regarded as a peak derived from the modified polymer, and the content is determined.

Since the modified polymer of the present invention satisfies the above-described conditions, for example, a functional group or the like can be efficiently introduced at an excellent introduction rate. The modified polymer of the present invention can exhibit various properties, for example, by satisfying the above-described conditions. In addition, since the Group 17 element ($\beta$) of the modified polymer of the present invention has, for example, high reactivity or specific reactivity, by using the property thereof, various modifying methods can be applied to the modified polymer of the present invention being used as a starting material, thereby changing the modified polymer into a useful modified polymer in which the property has further modified. It is to be noted that the present invention is not limited thereto, and it is also possible to further react the Group 15 element or the Group 16 element (α) of the modified polymer of the present invention to modify into another structure.

In the modified polymer of the present invention, as described above, it is preferable that the ratio between the element (α) % and the element (β) % satisfy the above-described conditions, and that, for example, the modified polymer contain the element (α) and the element (β) relatively higher than conventional polymer. In such a case, it can be said that that the modified polymer of the present invention is further useful as a material for various applications.

In the modified polymer of the present invention, for example, it is preferable that the element (α)% [Cα] be the total percentage of all the elements belonging to the Group 15 and the Group 16, the element (β)% [Cβ] be the total percentage of all the elements belonging to the Group 17 element, and [Cα]/[Cβ] be a ratio calculated from these total element percentages and satisfy the above-described conditions. Regarding the Group 15 element, the Group 16 element, and the Group 17 element, reference can be made to the description as to the modifying method of the present invention.

The "element %" means a ratio of a predetermined element when all the elements constituting a polymer excluding hydrogen and helium are assumed to be 100%, and specifically, is an index indicating the ratio of the number of elements present in all elements other than hydrogen and helium, calculated by analysis of the polymer by X-ray photoelectron spectroscopy.

In the present invention, the "element (α) %" is the ratio (%) of at least one element selected from the group consisting of the Group 15 elements and the Group 16 elements when all the elements (excluding hydrogen and helium) constituting the modified polymer of the present invention are assumed to be 100%. Specifically, it is preferable that the "element (α) %" be the ratio (%) of all the elements belonging to the Group 15 and the Group 16. The "element (β) %" is a ratio (%) of the Group 17 element when all the elements (excluding hydrogen and helium) constituting the modified polymer of the present invention are assumed to be 100%. Specifically, it is preferable that the "element (β) %" be the ratio (%) of all the elements belonging to Group 17.

In the modified polymer of the present invention, the lower limit of [Cα]/[Cβ] is greater than 0 and is preferably 0.01 or more, 0.1 or more, or 0.5 or more, for example, as described above, and the upper limit of [Cα]/[Cβ] is 5000 or less and is preferably 100 or less or 20 or less, for example, as described above. [Cα]/[Cβ] is in the range of greater than 0 to 5000 or less and is preferably in the range from 0.1 to 5000, 0.1 to 100, 0.1 to 20, 0.5 to 5000, 0.5 to 100, or 0.5 to 20, for example, as described above. When the modified polymer is out of the condition of 5000≥[Cα]/[Cβ]>0, for example, the balance between the content of the Group 15 element and the Group 16 element (element (α)) and the content of the Group 17 element (element (β)) is lost (that is, the content of either the element (α) or the element (β) is relatively extremely high), so that the degree of freedom may be narrowed when the function is imparted by further modification or the like.

In the modified polymer of the present invention, the lower limit of the [Cα] value (unit: element %) is preferably 1% or more, 2% or more, 3% or more, or 4% or more, for example, and the upper limit of the [Cα] value is preferably 50% or less, 30% or less, or 10% or less, for example, and the [Cα] value is preferably in the range from 1 to 50%, from 1 to 30%, from 1 to 10%, from 2 to 50%, from 2 to 30%, from 2 to 10%, from 3 to 50%, from 3 to 30%, from 3 to 10%, from 4 to 50%, from 4 to 30%, or from 4 to 10%, for example.

In the modified polymer of the present invention, the lower limit of the [Cβ] value (unit: element %) is preferably 0.01% or more, 0.02% or more, 0.05% or more, or 0.5% or more, for example. The upper limit of the [Cβ] value is preferably 50% or less, 40% or less, 15% or less, or 10% or less, for example. The [Cβ] value is preferably in the range from 0.01 to 50%, 0.01 to 40%, 0.01 to 15%, 0.01 to 10%, 0.02 to 50%, 0.02 to 40%, 0.02 to 15%, 0.02 to 10%, 0.05 to 50%, 0.05 to 40%, 0.05 to 15%, 0.05 to 10%, 0.5 to 50%, 0.5 to 40%, 0.5 to 15%, or 0.5 to 10%, for example.

In the modified polymer of the present invention, when the [Cα] value and the [Cβ] value are in the above-described ranges, a sufficient degree of freedom can be ensured, for example, when a function is imparted by further modification or the like.

As a method for modifying a polymer such as polyethylene or polypropylene, for example, a method of introducing maleic anhydride using a radical reaction has been known. However, in such a conventional method, for example, a cross-linking reaction or a decomposition reaction in the polymer may occur concurrently under commercially suitable conditions, and in many cases, the introduction rate of maleic anhydride in the modified polymer remains at about several weight %. The introduction rate of the functional group of the polymer of the present invention is preferably equal to or higher than that of such an example.

In the modified polymer of the present invention, each of the element (α) and the element (β) may be contained, for example, as a functional group. Examples of the functional group containing the element (α) include a hydroxyl group, a carbonyl group, and an amino group, and examples of the functional group containing the element (β) include a chlorine group, a bromine group, an iodine group, an alkyl chloride group, an alkyl bromide group, and an alkyl iodide group.

In the modified polymer of the present invention, the polymer containing the element (α) and the element (β) (also referred to as a polymer skeleton) is, for example, a polymer containing carbon and hydrogen and having a carbon-hydrogen bond. The polymer can be, for example, polyolefin and the like as described above, and examples of the polyolefin include polyethylene and polypropylene.

The modified polymer of the present invention may be, for example, an unmolded body or a molded body when it is in a solid state. The modified polymer may be used in combination with other polymers. The modified polymer of the present invention may be in a liquid state as described above. The modified polymers of the present invention may be used, for example, in combination with other liquid polymers. Of course, as the modified polymer of the present invention, for example, the combination of the solid molded body and the liquid polymer can be used in combination. Regarding the form of the modified polymer of the present invention, reference can be made to the description as to the modifying method of the present invention.

The modified polymer of the present invention can be produced by, for example, the modifying method of the present invention as described above, and can be obtained by reacting a radical containing an element selected from the group consisting of Group 15 elements and Group 16 elements and a Group 17 element with the polymer serving as a base as described above. It is preferable that the polymer serving as the base and the obtained modified polymer satisfy, for example, the following relationship.

That is, when the element content of at least one element (α) selected from the group consisting of the Group 15 elements and the Group 16 elements with respect to all the elements in the base polymer measured by the XPS method is defined as element % "Cα$_1$" and the content of the Group 17 element (β) with respect to all the elements in the base polymer measured by the XPS method is defined as element % "Cβ$_1$", it is preferable that the modified polymer satisfy the following two conditions. The following two conditions show that the modifying method of the present invention prefers an aspect in which an element selected from the group consisting of the Group 15 elements and the Group 16 elements is more easily introduced into the base polymer than the Group 17 element.

$$([C\alpha]-[C\alpha_1])/([C\beta]-[C\beta_1])>1$$

$$[C\beta]-[C\beta_1]>0$$

In the present invention, the lower limit of the value of $([C\alpha]-[C\alpha_1])/([C\beta]-[C\beta_1])$ is preferably 1.5 or more or 2 or more, for example. On the other hand, the upper limit of the value of $([C\alpha]-[C\alpha_1])/([C\beta]-[C\beta_1])$ is preferably 50 or less, 20 or less, 10 or less, or 8 or less, for example. The value of $([C\alpha]-[C\alpha_1])/([C\beta]-[C\beta_1])$ is preferably greater than 1 to 50 or less, greater than 1 to 20 or less, greater than 1 to 10 or less, greater than 1 to 8 or less, in the range from 1.5 to 50, from 1.5 to 20, from 1.5 to 10, from 1.5 to 8, from 2 to 50, from 2 to 20, from 2 to 10, or from 2 to 8, for example.

Next, as described above, the method for modifying a physical property of a polymer of the present invention includes the step of modifying a physical property of a polymer, and in the physical property modifying step, the polymer is modified by the modifying method of the present invention to modify the physical property. The modifying method in the physical property modifying method of the present invention is, for example, the first modifying method or the second modifying method. The physical property modifying method of the present invention is characterized in that the polymer is modified by the modifying method of the present invention, and other steps and conditions are not particularly limited. Regarding the modifying method of the present invention, reference can be made to the description as to the modifying method of the present invention.

EXAMPLES

Examples of the present invention are described below. The present invention, however, is not limited to the following examples.

Example A

As Example A, a modifying method using a liquid reaction system was performed.

Example A1

A fluorous solvent $(CF_3(CF_2)_4CF_3)$ was used as an organic phase. On the other hand, sodium chlorite $(NaClO_2)$ as a source of the dioxide radical and HCl as an acid were dissolved in an aqueous solvent ($D_2O$, D is deuterium), and the obtained aqueous solution was saturated with oxygen gas ($O_2$), thereby preparing an aqueous phase. In the aqueous phase, the final concentration of sodium chlorite was 500 mmol/L, and the final concentration of HCl was 500 mmol/L. 25 mL of the aqueous phase and 25 mL of the organic phase were placed in the same reaction vessel and brought into contact to form a two-phase reaction system. In the two-phase reaction system, the fluorous solvent as the organic phase was a lower layer, and the aqueous phase was an upper layer. Then, a polypropylene film (manufactured by Kaneka Corporation) was put into the reaction vessel. The film was submerged in the organic phase of the lower layer. The size of the film was 20 mm in length, 20 mm in width, and 0.1 mm in thickness. Then, in the atmosphere, the two-phase reaction system was irradiated with light at room temperature (about 25° C.) for 3 hours with a xenon lamp (500 W, manufactured by USHIO INC., attached with Pyrex® glass filter) having a wavelength of λ>290 nm, without pressurizing or decompressing. The entire upper surface of the film in the organic phase was irradiated with light from above the organic phase.

After the light irradiation, IR was performed on the surface of the film that has been irradiated with light. As a comparative example, the film was subjected to IR in advance in the same manner before being irradiated with light. The results are shown in FIG. 3. In FIG. 3, (A) is the result before the light irradiation, and (B) is the result after the light irradiation.

Figure 3A:
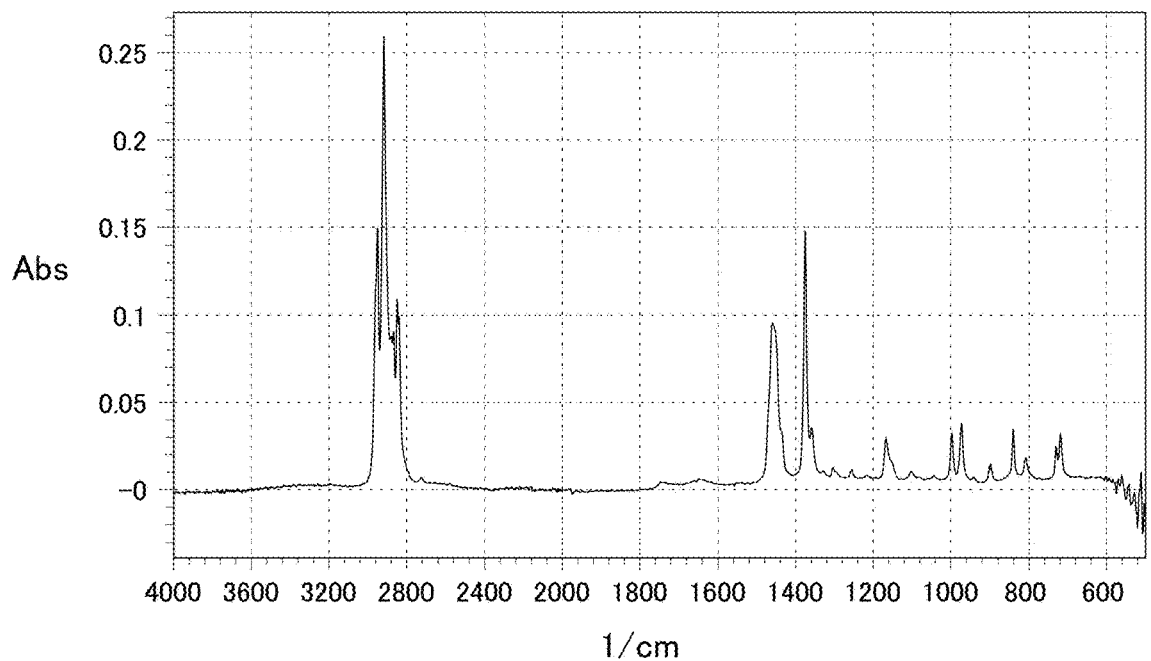
FIGS. 3A and 3B show graphs showing the results of IR of Example A1.
Figure 3B:
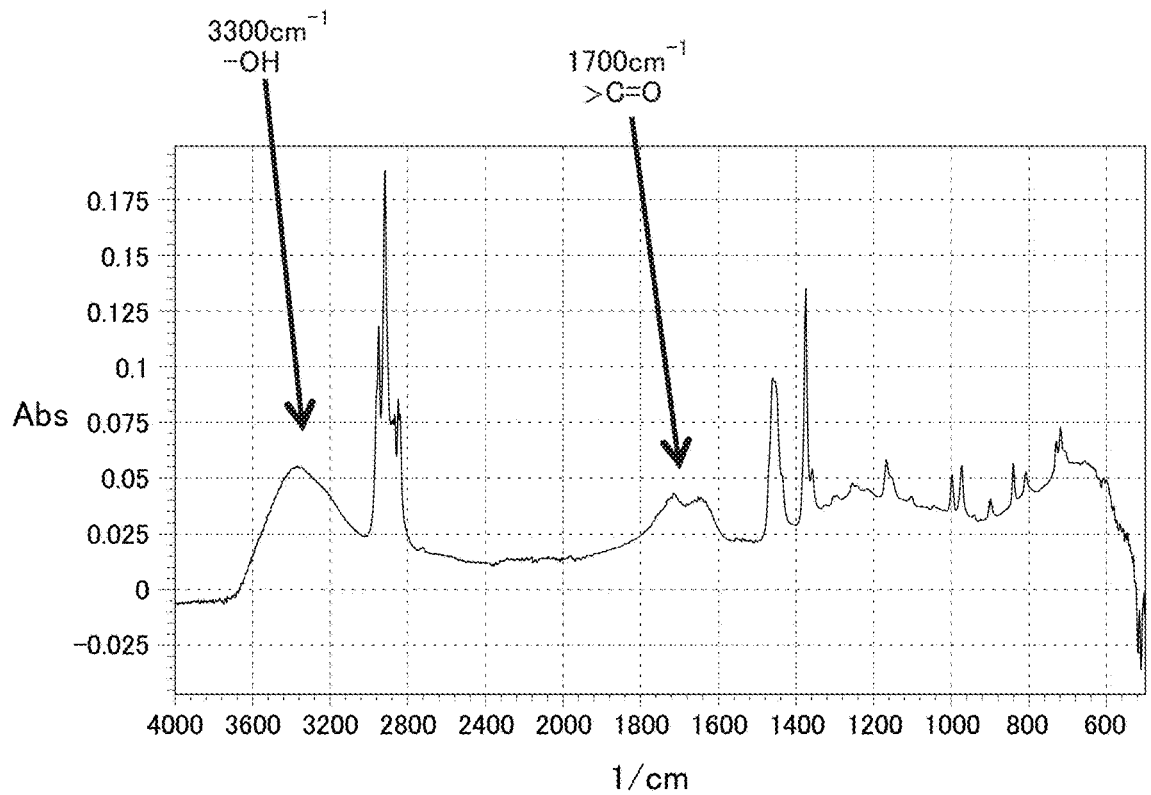

As shown in FIG. 3B, owing to the light irradiation, a peak showing a hydroxyl group (—OH) and a peak showing a carbonyl group (—C(═O)—) contained in a carboxy group (—COOH), which were not observed in FIG. 3A showing the result before the light irradiation, were observed. These results show that, in the polypropylene film, the methyl group of the side chain of the polymer was oxidized to a hydroxymethyl group (—CH$_3$OH) and a carboxymethyl group (—CH$_2$COOH), and the surface of the film was modified. Since a methyl group is a group having extremely low reactivity among saturated hydrocarbon groups, it is obvious that oxidation of other saturated hydrocarbon groups (ethyl group, propyl group, phenyl group, etc.) is also possible.

Figure 4:
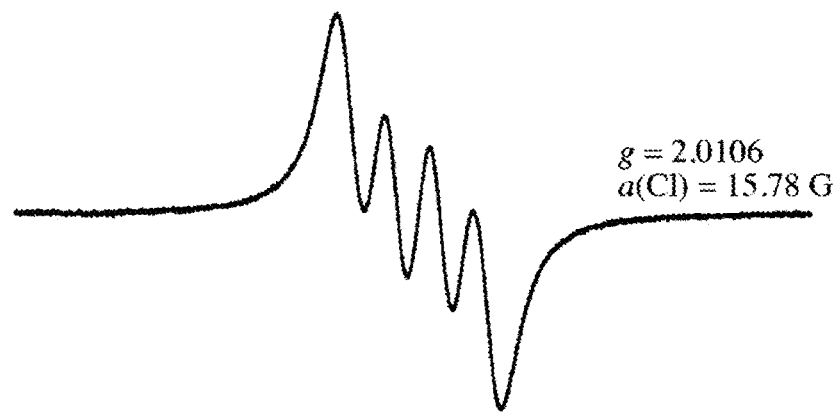
FIG. 4 is a graph showing the results of EPR indicating the generation of chlorine dioxide radicals in the reaction system of Example A1.

In Example 1, a chlorine dioxide radical was generated in a two-phase reaction system, and a polymer film was oxidized. The generation of the chlorine dioxide radical in the reaction system has been verified by EPR (Electron Spin Resonance). The results of the EPR are shown in FIG. 4.

Example B

As Example B, a modifying method using a gas phase reaction system was performed.

Example B1

4 mL of fluorous solvent $(CF_3(CF_2)_4CF_3)$, 2 mL of water ($H_2O$), 90 mg of sodium chlorite ($NaClO_2$), and 20 μL of 35% hydrochloric acid (HCl) were placed in the same reaction vessel and stirred for 5 minutes. The reaction vessel was allowed to stand still, thereby separating into the fluorous solvent as an organic phase, an aqueous phase, and a gas phase from the bottom. Since the organic phase became yellow, it was verified that white gas was generated in the gas phase. The chlorine dioxide radicals are generated in the aqueous phase and are dissolved in the more stable organic phase (fluorous solvent). That is, the change of color of the organic phase into yellow represents the generation of a chlorine dioxide radical, and thus the generation of the chlorine dioxide radical was verified in the present example. When the dissolution into the organic phase exceeds a limit amount, the chlorine dioxide radical flows out into the gas phase as a white gas. That is, since the generation of the white gas in the gas phase represents the presence of the chlorine dioxide radical in the gas phase, it was verified that the chlorine dioxide radical was present in the gas phase in this example.

Figure 5:
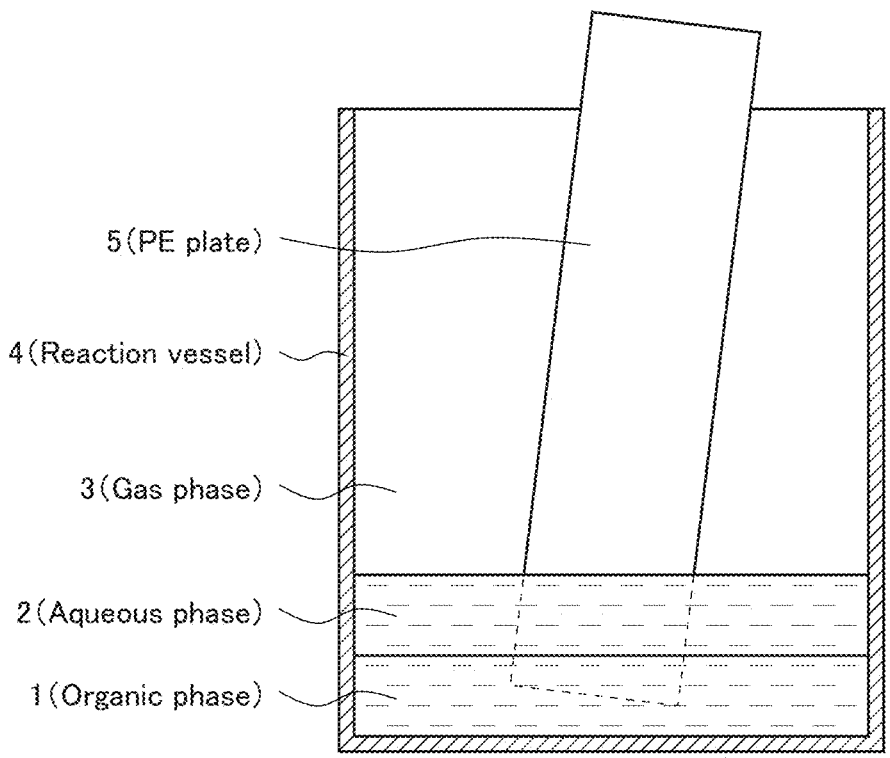
FIG. 5 is a cross-sectional view schematically showing a state of the reaction step in Example B1.

Next, a polyethylene plate (product No.: 2-9217-01, AS ONE Corporation) was put into the reaction vessel. The size of the polyethylene plate was 50 mm in length, 15 mm in width, and 1 mm in thickness. FIG. 5 is a schematic diagram showing a state in which the polyethylene plate is put in the reaction vessel. As shown in FIG. 5, in the reaction vessel 4, the organic phase 1, the aqueous phase 2, and the gas phase 3 were separated in this order, and the lower part of the polyethylene plate 5 was immersed in the organic phase 1, and the upper part of the polyethylene plate 5 was exposed to the gas phase 3. Then, the reaction vessel was made to be an open system without covering its upper part, and was irradiated with light in the atmosphere at room temperature (about 25° C.) with a xenon lamp (500 W, manufactured by USHIO INC., attached with Pyrex® glass filter) having a wavelength of λ>290 nm without pressurizing or decompressing the inside of the reaction vessel. It was observed that, during the light irradiation, the white gas was constantly generated in the gas phase, the chlorine dioxide radical was generated in the aqueous phase, the generated chlorine dioxide radical exceeded the dissolution limit, and excessive chlorine dioxide radical flowed out into the gas phase. As to the light irradiation, the surface of the polyethylene plate exposed to the gas phase in the reaction vessel was irradiated with light. Specifically, parallel light was emitted to the surface of the polyethylene plate so as to be perpendicular to the surface from a distance of 25 cm. Then, after 30 minutes from the start of the light irradiation, the yellow coloration of the organic phase disappeared, thereby completing the reaction.

After the light irradiation, infrared spectroscopy (IR) was performed on the surface of the polyethylene plate that has been irradiated with light. As a comparative example, the polyethylene plate was subjected to IR in advance in the same manner before being irradiated with light. For IR, FT/IR-4700 (product name, manufactured by JASCO Corporation) was used. The results are shown in FIG. 6. In FIG. 6, (A) is the result before the light irradiation, and (B) is the result after the light irradiation.

Figure 6A:
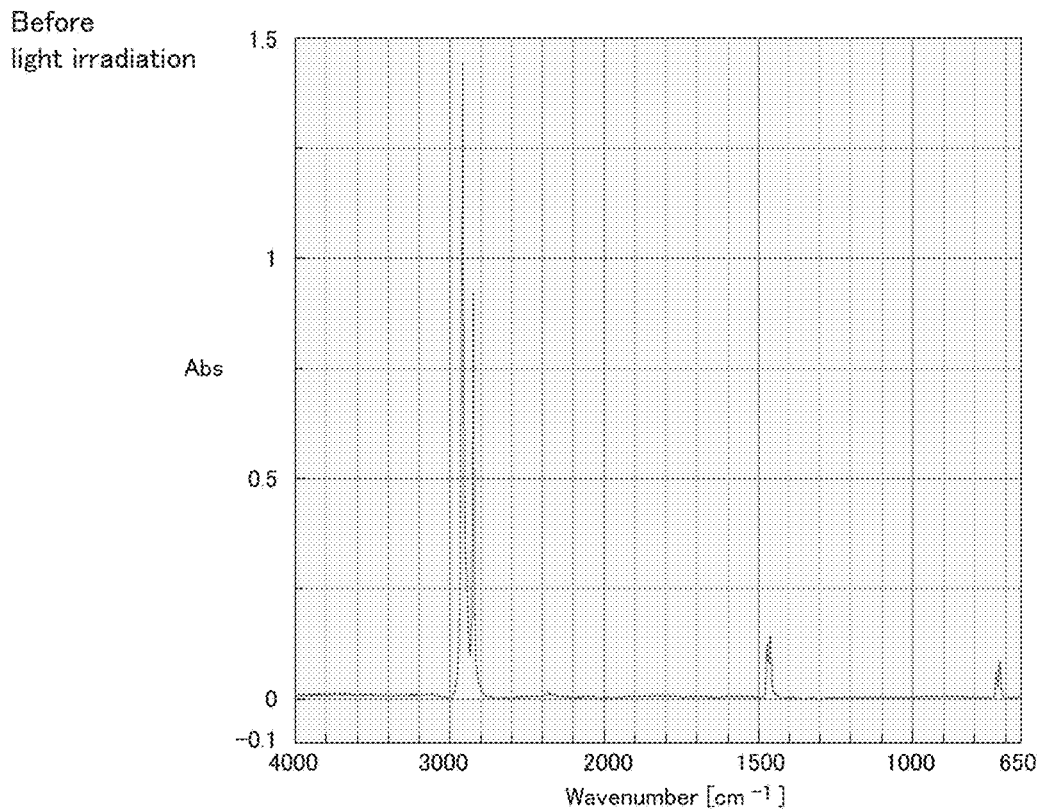
FIGS. 6A and 6B show graphs showing the results of IR of Example B1.
Figure 6B:
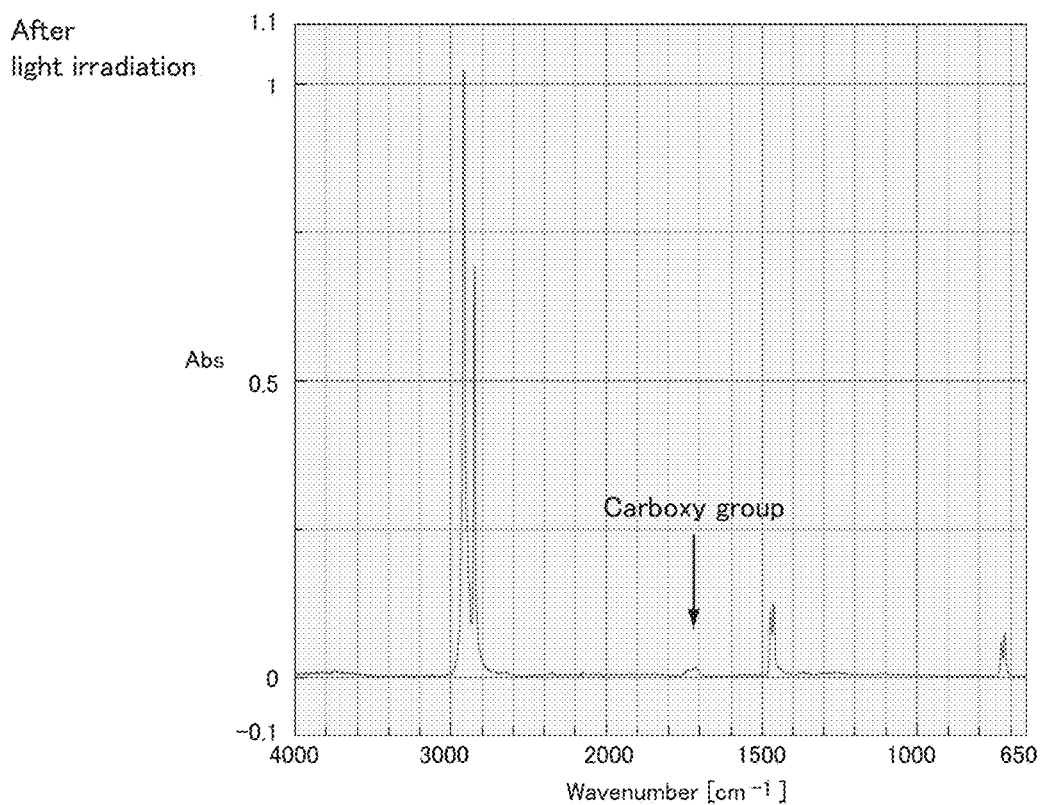

As shown in FIG. 6B, owing to the light irradiation, a peak (in the vicinity of 1700 cm$^{-1}$) showing a carboxy group (—COOH), which was not observed in FIG. 6A showing the result before the light irradiation, was observed. This result shows that, in the polyethylene plate, the C—H bond of polyethylene (in the vicinity of 2900 cm$^{-1}$) was oxidized to a carboxy group (in the vicinity of 1700 cm$^{-1}$) and the surface of the polyethylene plate was modified.

Example B2

A modifying treatment using a gas phase reaction system was performed in the same manner as in Example B1 except that polypropylene was used instead of the polyethylene.

(1) Polypropylene Film

Instead of the polyethylene plate, a polypropylene film was used. The polypropylene film was formed by heat pressing 3 g of polypropylene pellet (product name: prime Polypro®, manufactured by Prime Polymer Co., Ltd.) at 160° C. and 20 MPa for 10 minutes. The polypropylene film was cut to a size having a length of 50 mm, a width of 15 mm, and a thickness of 0.3 mm. After the light irradiation, IR was performed on the surface of the polypropylene film that has been irradiated with light in the same manner as in Example B1. As a comparative example, the polypropylene film was subjected to IR in advance in the same manner before being irradiated with light. The results are shown in FIG. 7. In FIG. 7, (A) is the result before the light irradiation, and (B) is the result after the light irradiation.

Figure 7A:
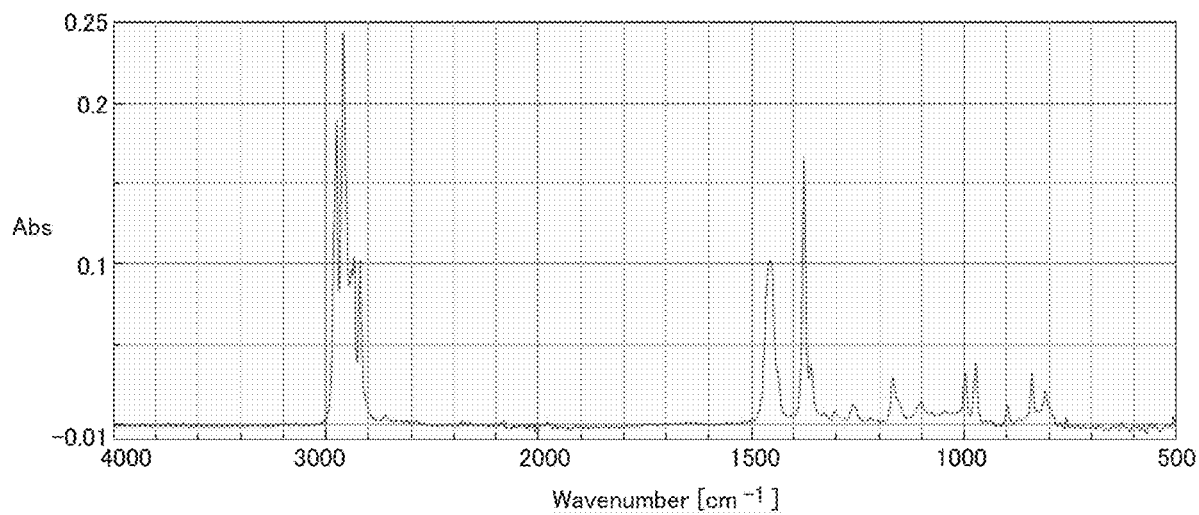
FIGS. 7A and 7B show graphs showing the results of IR of Example B2.
Figure 7B:
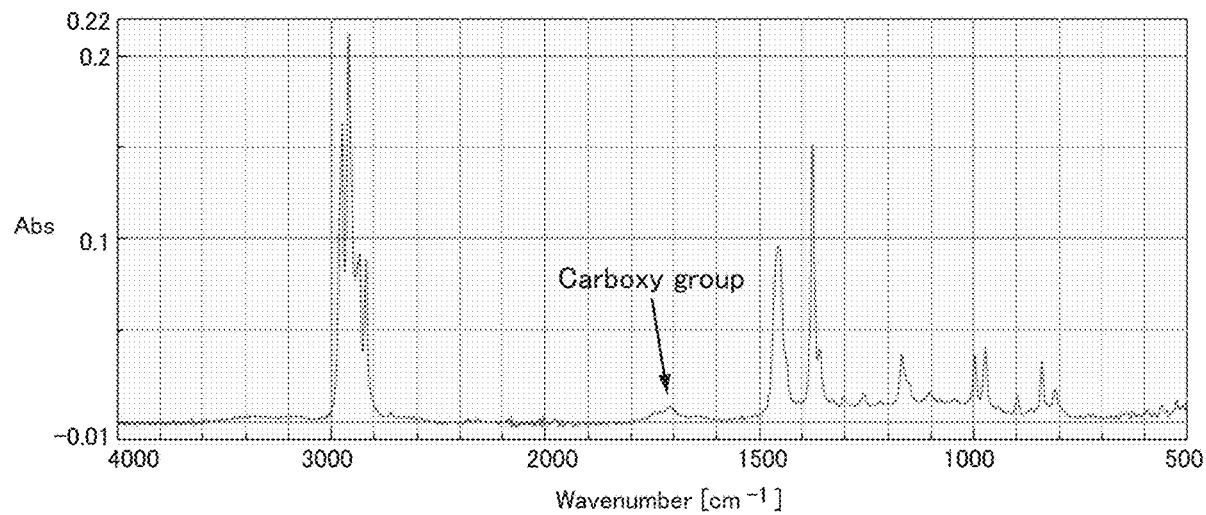

As shown in FIG. 7B, owing to the light irradiation, a peak (in the vicinity of 2900 cm$^{-1}$) showing a carboxy group (—COOH), which was not observed in FIG. 7A showing the result before the light irradiation, was observed. This result shows that, in the polypropylene film, the methyl group (—CH$_3$) of the side chain of polypropylene (in the vicinity of 2900 cm$^{-1}$) and the C—H bond contained in the main chain of polypropylene (in the vicinity of 2900 cm$^{-1}$) were oxidized to a carboxy group (—COOH) (in the vicinity of 1700 cm$^{-1}$), and the surface of the polypropylene film was modified.

Furthermore, X-ray photoelectron spectroscopy (XPS) was applied to the polypropylene film after being irradiated with the light. As a comparative example, XPS was applied to the film in advance in the same manner before being irradiated with light. The results are shown in FIG. 8. In FIG. 8, (A1) is the result of the wide scan analysis (XPS wide) by XPS before the light irradiation, (A2) is the result of the narrow scan analysis of carbon 1s (XPS C 1s) by XPS before the light irradiation, (B1) is the result of the wide scan analysis (XPS wide) by XPS after the light irradiation, and (B2) is the result of the narrow scan analysis of carbon 1s (XPS C 1s) by XPS after the light irradiation.

As shown in FIG. 8B1, the increase in the ratio of peak derived from the oxygen 1s owing to the light irradiation was observed as compared to FIG. 8A1 before the light irradiation. This result shows that the surface of the polypropylene film was oxidized. Further, as shown in FIG. 8B2, owing to the light irradiation, a peak in the vicinity of 289 eV derived from the carboxy group (—COOH), which was not observed in FIG. 8A2 showing the result before the light irradiation, was observed. This result shows that the surface of the polypropylene film was oxidized in the polypropylene film.

(2) Polypropylene Pellet

Next, the polypropylene pellet used for molding the polypropylene film was subjected to a modifying treatment in the following manner. 20 mL of a fluorous solvent (CF$_3$(CF$_2$)$_4$CF$_3$), 20 mL of water (H$_2$O), 200 mg of sodium chlorite (NaClO$_2$), and 200 μL of 35% hydrochloric acid (HCl) were placed in the same reaction vessel and stirred for 5 minutes. The reaction vessel was allowed to stand still, thereby separating into the fluorous solvent as an organic phase, an aqueous phase, and a gas phase from the bottom. Then, generation of the chlorine dioxide radical was verified by the organic phase becoming yellow.

Next, 3 g of polypropylene pellet (product name: Prime Polypro®, manufactured by Prime Polymer Co., Ltd.) was put into the reaction vessel. The shape of the polypropylene pellet was granular, and the size thereof was about 2 to 3 mm in diameter. In the reaction vessel, the polypropylene pellet was submerged in the organic phase. Then, the reaction vessel was made to be an open system without covering the upper part thereof, and was irradiated with light in the atmosphere at room temperature (about 25° C.) with a xenon lamp (500 W, manufactured by USHIO INC., attached with Pyrex® glass filter) having a wavelength of λ>290 nm while stirring with a magnetic stirrer without pressurizing or decompressing the inside of the reaction vessel. Specifically, the side surface of the reaction vessel was irradiated with light from a distance of 25 cm. Then, after 30 minutes from the start of the light irradiation, the yellow coloration of the organic phase disappeared, thereby completing the reaction.

In principle, since one surface of the pellet is irradiated with light, it can be considered that 50% or more of the surface area is modified.

The modified polypropylene pellet after the modifying treatment was sufficiently dried, and then the XPS measurement was performed, thereby examining the element introduced by the modification.

The XPS measurement conditions are described again below. A commercially available device (product name: AXIS-NOVA, manufactured by KmtoS) was used under the measurement conditions as follows: monochromatization AlKα (1486.6 eV) was used as an X-ray source and an analytical area was 300 μm×700 μm (set value).

From the measurement results, the composition ratio (element %) of the elements contained in the modified propylene pellet was calculated based on a conventional method. The results are shown in Table 1. The ratio between the Group 16 element [Cα] and the Group 17 element [Cβ] was [Cα]/[Cβ]=5.5/0.9=6.1.

TABLE 1

| Periodic table | Group 14 | Group 16 | Group 17 | Group 14 | Group 1 | Group 14 |
|---|---|---|---|---|---|---|
| Element | C | O | Cl | Si | Na | Sn |
| Element % | 93.2 | 5.5 | 0.9 | 0.2 | 0.1 | 0.1 |

Example B3

A modifying treatment using a gas phase reaction system was performed in the same manner as in Example B1 except that a polymethylmethacrylate (PMMA) plate was used instead of the polyethylene plate.

The size of the PMMA plate (product No.: 2-9208-01, AS ONE Corporation) used was 50 mm in length, 15 mm in width, and 1 mm in thickness. After the light irradiation, IR was performed on the surface of the PMMA plate that has been irradiated with light in the same manner as in Example B1. As a comparative example, the PMMA plate was subjected to IR in advance in the same manner before being irradiated with light. The results are shown in FIG. 9. In FIG. 9, (A) is the result before the light irradiation, and (B) is the result after the light irradiation.

Figure 9A:
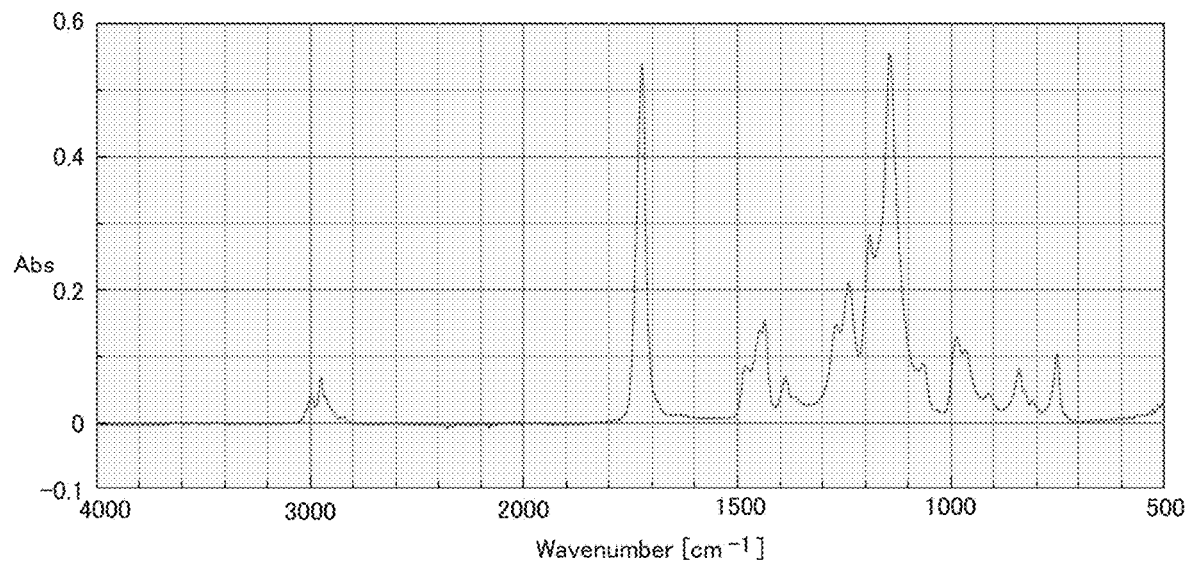
FIGS. 9A and 9B show graphs showing the results of IR of Example B3.
Figure 9B:
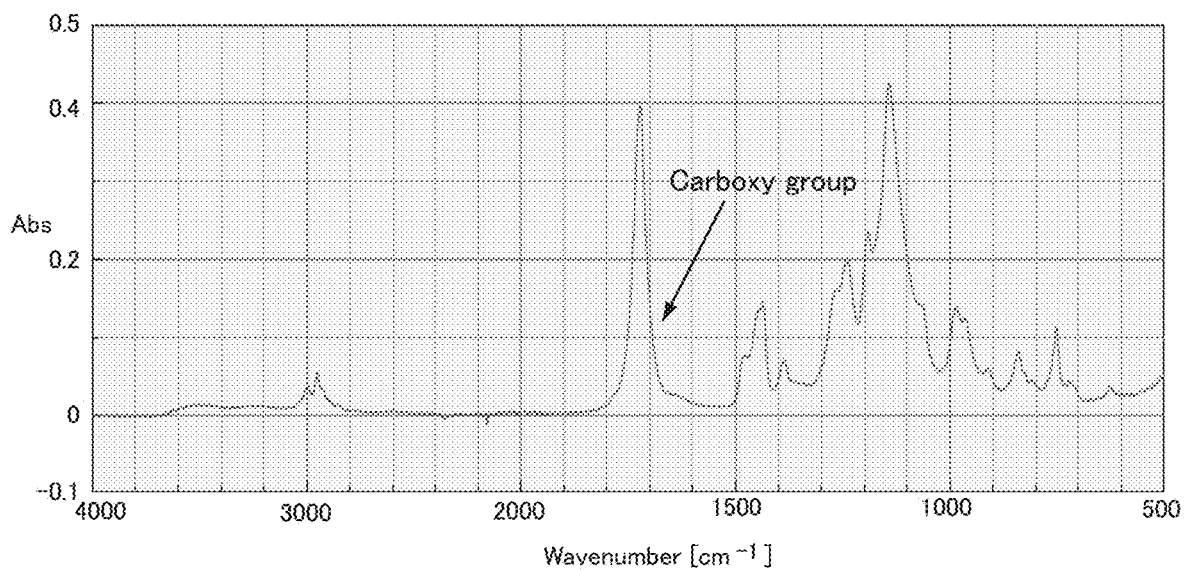

As shown in FIG. 9, in FIG. 9B after the light irradiation, as shown by the arrow, the vicinity of the 1700 cm$^{-1}$ was widely raised as compared to FIG. 9A before the light irradiation, and the broadening of the shoulder peak was observed. The peak corresponds to a carbonyl group (—C(=O)—) contained in an ester group (—COOR), a carboxy group (—COOH), or the like. This result shows that, in the PMMA plate, a C—H bond contained in a methyl group (—CH$_3$) or the like of the side chain of the PMMA was oxidized to a carboxy group (—COOH), and the surface of the PMMA plate was modified.

Example B4

A modifying treatment using a gas phase reaction system was performed in the same manner as in Example B1 except that a polydimethylsiloxane (PDMS) film was used instead of the polyethylene plate.

The PDMS film (product name: Sylgard 184, manufactured by Dow Corning Toray Co., Ltd.) used was 40 mm in length, 15 mm in width, and 1 mm in thickness. After the light irradiation, IR was performed on the surface of the PDMS film that has been irradiated with light in the same manner as in Example B1. As a comparative example, the PDMS film was subjected to IR in advance in the same manner before being irradiated with light. The results are shown in FIG. 10. In FIG. 10, (A) is the result before the light irradiation, and (B) is the result after the light irradiation.

Figure 10A:
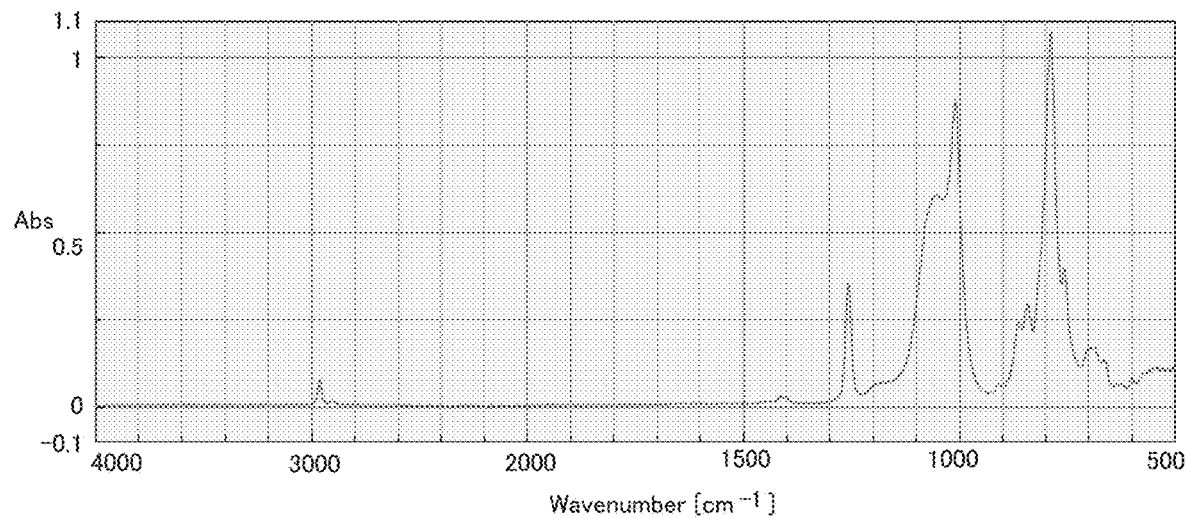
FIGS. 10A and 10B show graphs showing the results of IR of Example B4.
Figure 10B:
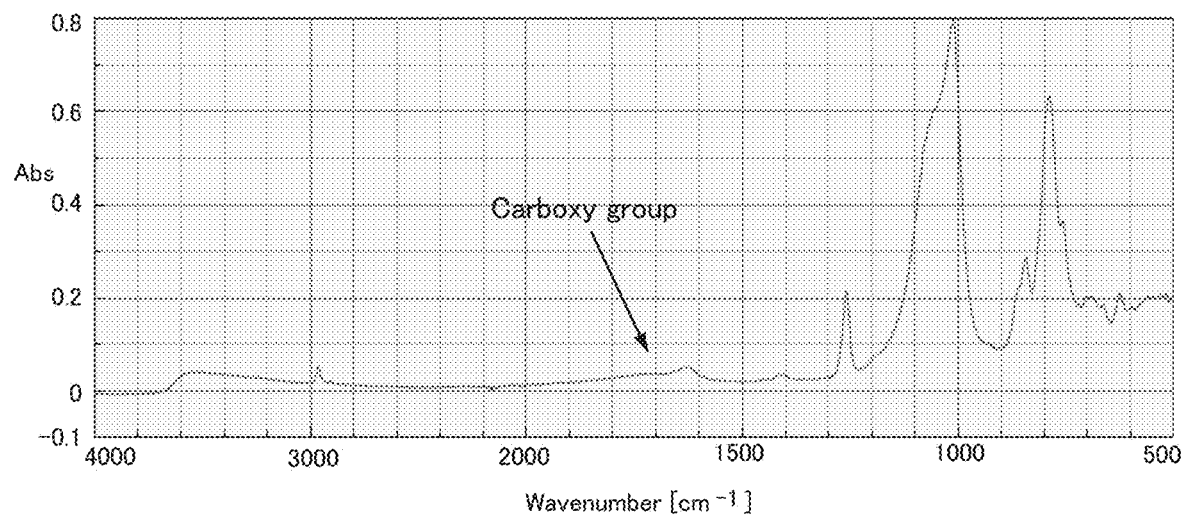

As shown in FIG. 10, a peak in the vicinity of 1700 cm$^{-1}$ was not observed in FIG. 10A showing the result before the light irradiation, whereas a peak in the vicinity of 1700 cm$^{-1}$ was observed in of FIG. 10B after the light irradiation. The peak corresponds to a carboxy group (—COOH). This result shows that, in the PDMS film, the methyl group (—CH$_3$) of the side chain of the PDMS (peak in the vicinity of 2900 cm$^{-1}$) and the C—H bond of the main chain of the PDMS (peak in the vicinity of 2900 cm$^{-1}$) were oxidized to a carboxy group (—COOH) (peak in the vicinity of 1700 cm$^{-1}$), and the surface of the PDMS film was modified.

Example B5

A modifying treatment using a gas phase reaction system was performed in the same manner as in Example B1 except that a polycarbonate (PC) plate was used instead of the polyethylene plate.

The polycarbonate (PC) plate (product No.: 2-9226-01, AS ONE Corporation) used was 50 mm in length, 15 mm in width, and 1 mm in thickness. After the light irradiation, IR was performed on the surface of the PC plate that has been irradiated with light in the same manner as in Example B1. As a comparative example, the PC plate was subjected to IR in advance in the same manner before being irradiated with light. The results are shown in FIG. 11. In FIG. 11, (A) is the result before the light irradiation, and (B) is the result after the light irradiation.

Figure 11A:
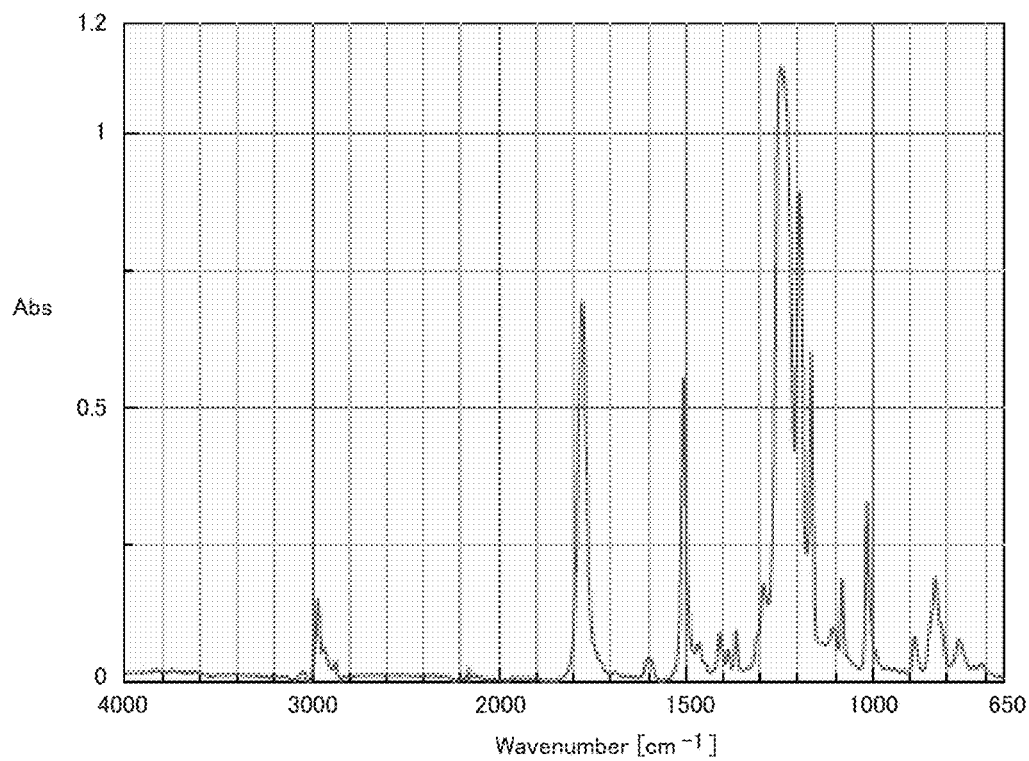
FIGS. 11A and 11B show graphs showing the results of IR of Example B5.
Figure 11B:
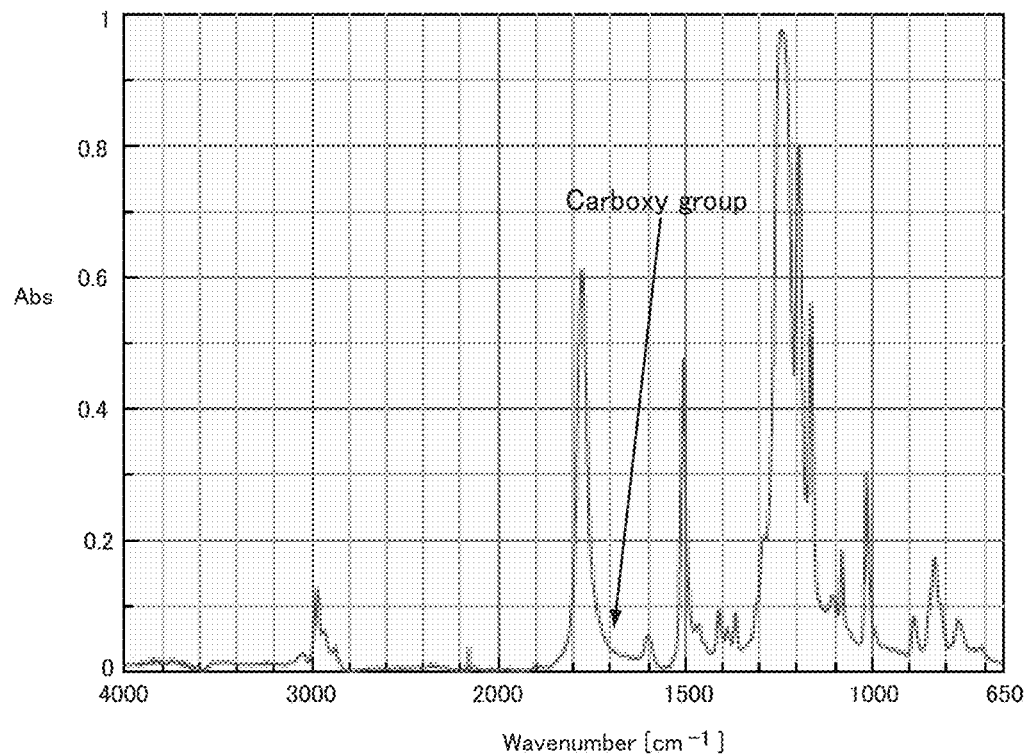

As shown in FIG. 11, in FIG. 11B after the light irradiation, as shown by the arrow, the vicinity of the 1700 cm$^{-1}$ was widely raised as compared to FIG. 11A before the light irradiation, and the broadening of the shoulder peaks was observed. The peak corresponds to a carbonyl group (—C(=O)—) contained in a carbonate group (—O—(C=O)—O—), a carboxy group (—COOH), or the like. This result shows that, in the PC plate, a C—H bond contained in a methyl group (—CH$_3$) or the like of the side chain of the PC was oxidized to a carboxy group (—COOH), and the surface of the PC plate was modified.

Example B6

A modifying treatment using a gas phase reaction system was performed in the same manner as in Example B1 except that a liquid crystal polymer (LCP) plate was used instead of the polyethylene plate.

The LCP plate (product name: 6030 g-mf, manufactured by UENO FINE CHEMICALS INDUSTRY.LTD.) used was 50 mm in length, 15 mm in width, and 1 mm in thickness. After the light irradiation, IR was performed on the surface of the LCP plate that has been irradiated with light in the same manner as in Example B1. As a comparative example, the LCP plate was subjected to IR in advance in the same manner before being irradiated with light. The results are shown in FIG. 12. In FIG. 12, (A) is the result before the light irradiation, and (B) is the result after the light irradiation.

Figure 12A:
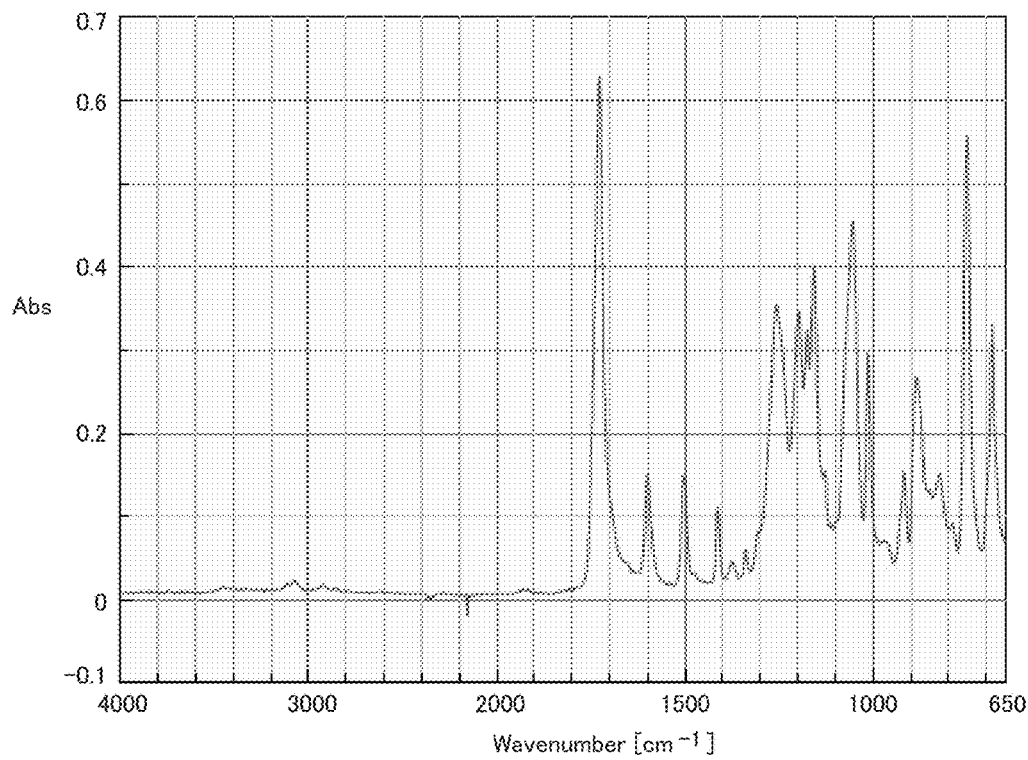
FIGS. 12A and 12B show graphs showing the results of IR of Example B6.
Figure 12B:
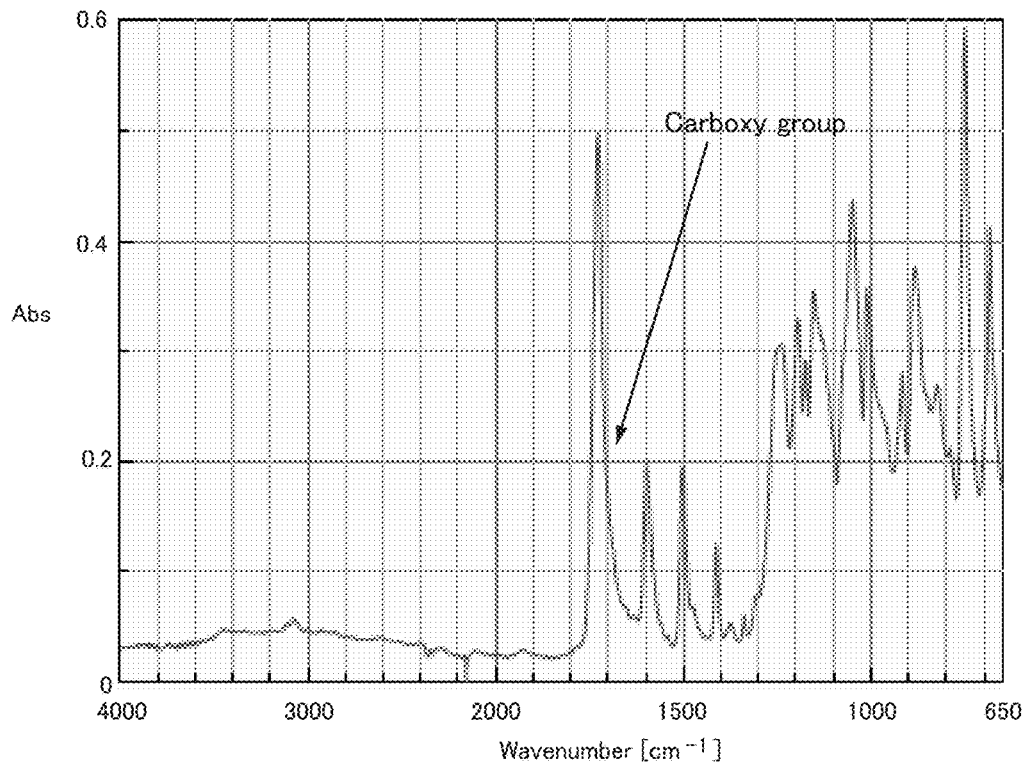

As shown in FIG. 12, in FIG. 12B after the light irradiation, as shown by the arrow, the vicinity of the 1700 cm$^{-1}$ was widely raised as compared to FIG. 12A before the light irradiation, and the broadening of the shoulder peaks was observed. The peak corresponds to a carbonyl group (—C(=O)—) contained in an ester group (—COOR), a carboxy group (—COOH), or the like. This result shows that, in the LCP plate, a C—H bond contained in the LCP was oxidized to a carboxy group (—COOH) and the surface of the LCP plate was modified.

While the present invention has been described above with reference to illustrative embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2016-244690 filed on Dec. 16, 2016. The entire subject matter of the Japanese Patent Application is incorporated herein by reference.

INDUSTRIAL APPLICABILITY

As described above, according to the modifying method of the present invention, a polymer in a reaction system can be easily modified by simply irradiating the reaction system with light.

REFERENCE SIGNS LIST 1 organic layer (organic phase)
2 aqueous layer (aqueous phase)
3 gas phase
4 reaction vessel
5 plate

The invention claimed is:

1. A method for producing a modified polymer comprising:
    modifying a polymer by a method comprising:
    irradiating a reaction system containing a polymer with light to react the reaction system
    in a presence of a compound radical, wherein
    the compound radical is a radical containing one element selected from the group consisting of Group 15 elements and Group 16 elements, and a Group 17 element,
    wherein the polymer contains carbon and hydrogen and has a carbon-hydrogen bond, and the carbon-hydrogen bond in the polymer is oxidized.

2. The method according to claim 1, wherein
    the Group 15 element is at least one of N or P,
    the Group 16 element is at least one selected from the group consisting of O, S, Se, and Te, and
    the Group 17 element is at least one selected from the group consisting of F, Cl, Br, and I.

3. The method according to claim 1, wherein
    the reaction system is a gas reaction system, and
    the gas reaction system contains the compound radical.

4. The method according to claim 1, wherein
    the reaction system is a liquid reaction system,
    the liquid reaction system contains an organic phase, and
    in the reaction step, at least the organic phase is irradiated with light.

5. The method according to claim 4, wherein
    the liquid reaction system is a two-phase reaction system containing the organic phase and an aqueous phase.

6. The method according to claim 4, wherein
    in the reaction step, the liquid reaction system is irradiated with light while bringing the liquid reaction system into contact with air.

7. The method according to claim 4, wherein
    the liquid reaction system is a two-phase reaction system containing the organic phase and an aqueous phase, and
    in the reaction step, the aqueous phase is irradiated with light in a state in which oxygen is dissolved in the aqueous phase.

8. The method according to claim 4, wherein
    the organic phase contains an organic solvent, and the organic solvent is at least one selected from the group consisting of a hydrocarbon solvent, a halogenated solvent, and a fluorous solvent.

9. A method according to claim 1, wherein
    the compound radical is an oxide radical of the Group 17 element.

10. A method according to claim 1, wherein
    the Group 17 element is halogen.

11. A method according to claim 1, wherein
    the compound radical is a chlorine dioxide radical.

12. A method according to claim 1, wherein
    the compound radical is a chlorine dioxide radical,
    the reaction system contains an organic phase,
    the organic phase contains the chlorine dioxide radical,
    a molded body of the polymer is disposed in the organic phase, and
    in the reaction step, a polymer exposed on a surface of the polymer molded body is oxidized by the light irradiation.

13. A method according to claim 1, further comprising the step of:
    introducing a functional group into a changed site of the polymer.

14. A method for modifying a polymer comprising the step of:
    irradiating a reaction system containing a polymer with light in a presence of a compound, wherein
    the compound is a compound containing one element selected from the group consisting of Group 15 elements and Group 16 elements, a Group 17 element, and a Group 1 element
    wherein the polymer contains carbon and hydrogen and has a carbon-hydrogen bond, and the carbon-hydrogen bond in the polymer is oxidized.

15. The modifying method according to claim 14, wherein
    the Group 15 element is at least one of N or P,
    the Group 16 element is at least one selected from the group consisting of O, S, Se, and Te,
    the Group 17 element is at least one selected from the group consisting of F, Cl, Br, and I, and
    the Group 1 element is at least one selected from the group consisting of H, Li, Na, K, Rb, and Cs.

16. The modifying method according to claim 14, further comprising the step of:
    generating the compound, wherein
    in the compound generating step, at least one of a Lewis acid or a Brønsted acid containing a Group 1 element is caused to act on a compound ion containing one element selected from the group consisting of the Group 15 elements and the Group 16 elements, and the Group 17 element.

17. A modified polymer comprising:
    at least one element (a) selected from the group consisting of Group 15 elements and Group 16 elements, and a Group 17 element (β); and
    a site in which a ratio between the element (α)% [Cα] to all elements excluding hydrogen and helium in the polymer specified by an XPS method and the element (β)% [Cβ] to all elements excluding hydrogen and helium in the polymer specified by an XPS method satisfies the following condition, $5000 \geq [C\alpha]/[C\beta] > 0$, wherein the modified polymer is formed from a polymer containing carbon and hydrogen and having a carbon-hydrogen bond, wherein the carbon-hydrogen bond in the polymer is oxidized.

18. The modified polymer according to claim 17, wherein the polymer contains a functional group containing at least one element ($\alpha$) selected from the group consisting of Group 15 elements and Group 16 elements, and a functional group containing a Group 17 element ($\beta$).

* * * * *